US012615126B2

(12) United States Patent
Wu et al.

(10) Patent No.: US 12,615,126 B2
(45) Date of Patent: Apr. 28, 2026

(54) USING SPATIAL DIFFERENCES BETWEEN TRANSMITTER RECEIVER POINTS (TRPs) TO OBTAIN EXTRA DIVERSITY GAINS

(71) Applicant: Apogee 5G Global, LLC, Plano, TX (US)

(72) Inventors: Keying Wu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 255 days.

(21) Appl. No.: 18/098,699

(22) Filed: Jan. 19, 2023

(65) Prior Publication Data

US 2023/0155795 A1    May 18, 2023

Related U.S. Application Data

(63) Continuation of application No. PCT/CN2021/102643, filed on Jun. 28, 2021.

(30) Foreign Application Priority Data

Jul. 20, 2020    (CN) .......................... 202010701550.1

(51) Int. Cl.
*H04L 5/00* (2006.01)

(52) U.S. Cl.
CPC .......... *H04L 5/0078* (2013.01); *H04L 5/0051* (2013.01)

(58) Field of Classification Search
CPC ... H04L 5/0078; H04L 5/0051; H04L 5/0053; H04L 5/0094; H04L 5/0007; H04L 5/0023; H04B 7/0408
See application file for complete search history.

(56) References Cited

U.S. PATENT DOCUMENTS

2004/0032909 A1    2/2004   Gonzalez
2020/0267671 A1*   8/2020   Chae ...................... H04L 5/001
(Continued)

FOREIGN PATENT DOCUMENTS

CN        106788926 A      5/2017
CN        106877984 A      6/2017
(Continued)

OTHER PUBLICATIONS

ISR received in application No. PCT/CN2021/102643 dated Aug. 19, 2021.

(Continued)

*Primary Examiner* — Ian N Moore
*Assistant Examiner* — Latresa A Mccallum
(74) *Attorney, Agent, or Firm* — Volpe Koenig

(57) ABSTRACT

Method and a device in UE and base station for wireless communication. A first node receives a first signaling; transmits a first signal in a first time pool, and transmits a second signal in a second time pool. The first signaling is used to determine K time windows; the first time window and the second time window are respectively two time windows that are adjacent among the K time windows, the first time window and the second time window being respectively associated with a first reference signal and a second reference signal; whether a first condition set is satisfied is used to determine whether the first time pool comprises all multicarrier symbols in the first time window and/or whether the second time pool comprises all multicarrier symbols in the second time window. The above method satisfies the request for processing time of beam handover and improves the resource utilization ratio.

20 Claims, 5 Drawing Sheets

(56) References Cited

U.S. PATENT DOCUMENTS

| | | | | |
|---|---|---|---|---|
| 2020/0396754 | A1* | 12/2020 | Wu | H04L 5/0053 |
| 2021/0235247 | A1* | 7/2021 | Lee | H04W 4/70 |
| 2021/0385840 | A1* | 12/2021 | Cirik | H04W 16/14 |
| 2023/0074086 | A1* | 3/2023 | Yi | H04L 1/1822 |
| 2024/0406917 | A1* | 12/2024 | Manolakos | H04W 76/28 |

FOREIGN PATENT DOCUMENTS

| | | |
|---|---|---|
| CN | 107113268 A | 8/2017 |
| CN | 107483166 A | 12/2017 |
| CN | 107623564 A | 1/2018 |
| CN | 108242944 A | 7/2018 |
| CN | 109039555 A | 12/2018 |
| CN | 109391298 A | 2/2019 |
| CN | 110120859 A | 8/2019 |
| CN | 111431680 A | 7/2020 |

OTHER PUBLICATIONS

First Search Report of Chinses patent application No. CN202010701550.1 dated May 12, 2022.

Notification to Grant Patent Right for Invention of Chinses patent application No. CN202010701550.1 dated May 25, 2022.

Third Generation Partnership Project, "Technical Specification Group Radio Access Network; NR; Physical channels and modulation (Release 16)," 3GPP TS 38.211 V16.2.0 (Jun. 2020).

Third Generation Partnership Project, "Technical Specification Group Radio Access Network; NR; Multiplexing and channel coding (Release 16)," 3GPP TS 38.212 V16.1.0 (Mar. 2020).

Third Generation Partnership Project, "Technical Specification Group Radio Access Network; NR; Physical layer procedures for data (Release 16)," 3GPP TS 38.214 V16.1.0 (Mar. 2020).

Third Generation Partnership Project, "Technical Specification Group Radio Access Network; NR; Radio Resource Control (RRC) protocol specification (Release 16)," 3GPP TS 38.331 V16.0.0 (Mar. 2020).

* cited by examiner

100

First node

— 101
receiving first signaling

— 102
transmitting first signal in first time pool

— 103
transmitting second signal in second time pool

5GS/EPS 200

HSS/UDM — 220

NG-RAN 202

MME/AMF/SMF — 211 other MMEs/AMFs/SMFs — 214

UE — 201

NR NodeB — 203

S-GW/UPF — 212

P-GW/UPF — 213

Internet service — 230

UE — 241 other NR Nodes B — 204

5GC/EPC 210

Control Plane 300

User Plane 350

L3    RRC — 306

SDAP — 356

305

L2    PDCP — 304

RLC — 303

MAC — 302

355    L2    PDCP — 354

RLC — 353

MAC — 352

L1    PHY — 301

L1    PHY — 351

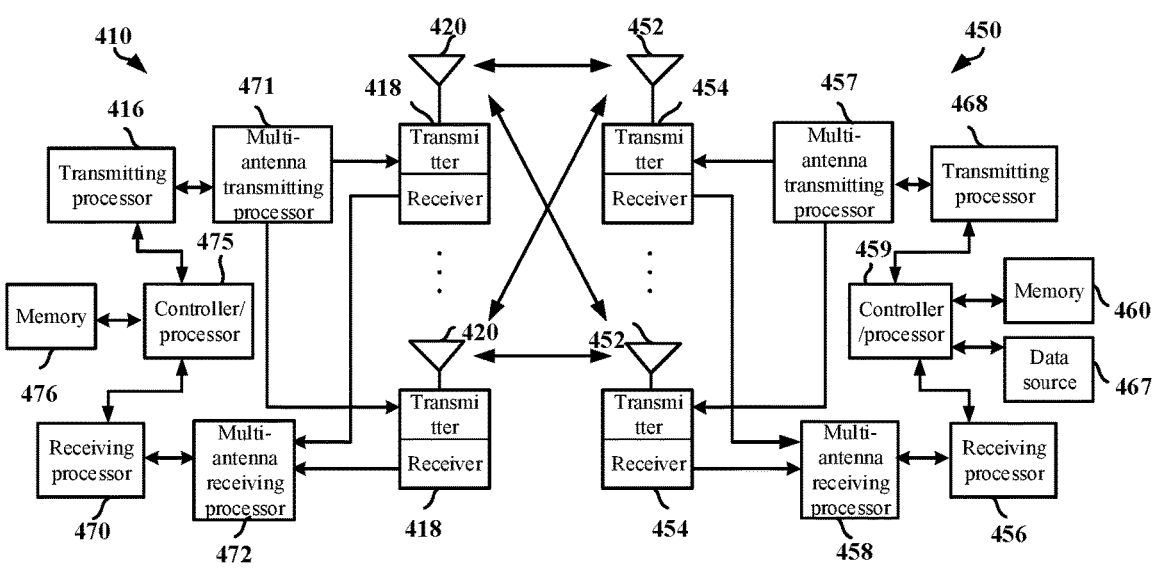

FIG. 4

| Second node U1 | First node U2 |
|---|---|

S511.transmitting first signaling

———————first signaling———————▶

S521.receiving first signaling

S522.transmitting first signal in first time pool

◀————————first signal————————

S512.receiving first signal in first time pool

S523.transmitting second signal in second time pool

◀————————second signal————————

S513.receiving second signal in second time pool

S5201.transmitting sub-signal(s) among K sub-signals other than first signal and second signal ◀—— sub-signal(s) among K sub-signals other than first signal and second signal ——

F51. optional

S5101.receiving sub-signal(s) among K sub-signals other than first signal and second signal ( End )          ( End )

FIG. 5

| First signaling | First field | ... |
|---|---|---|

FIG. 6

| First signaling | Second field | ... |
|---|---|---|

FIG. 7 time window associated with first reference signal time window associated with second reference signal Time window#0        Time window#i        Time window#(i+1)        Time window#(K-1)

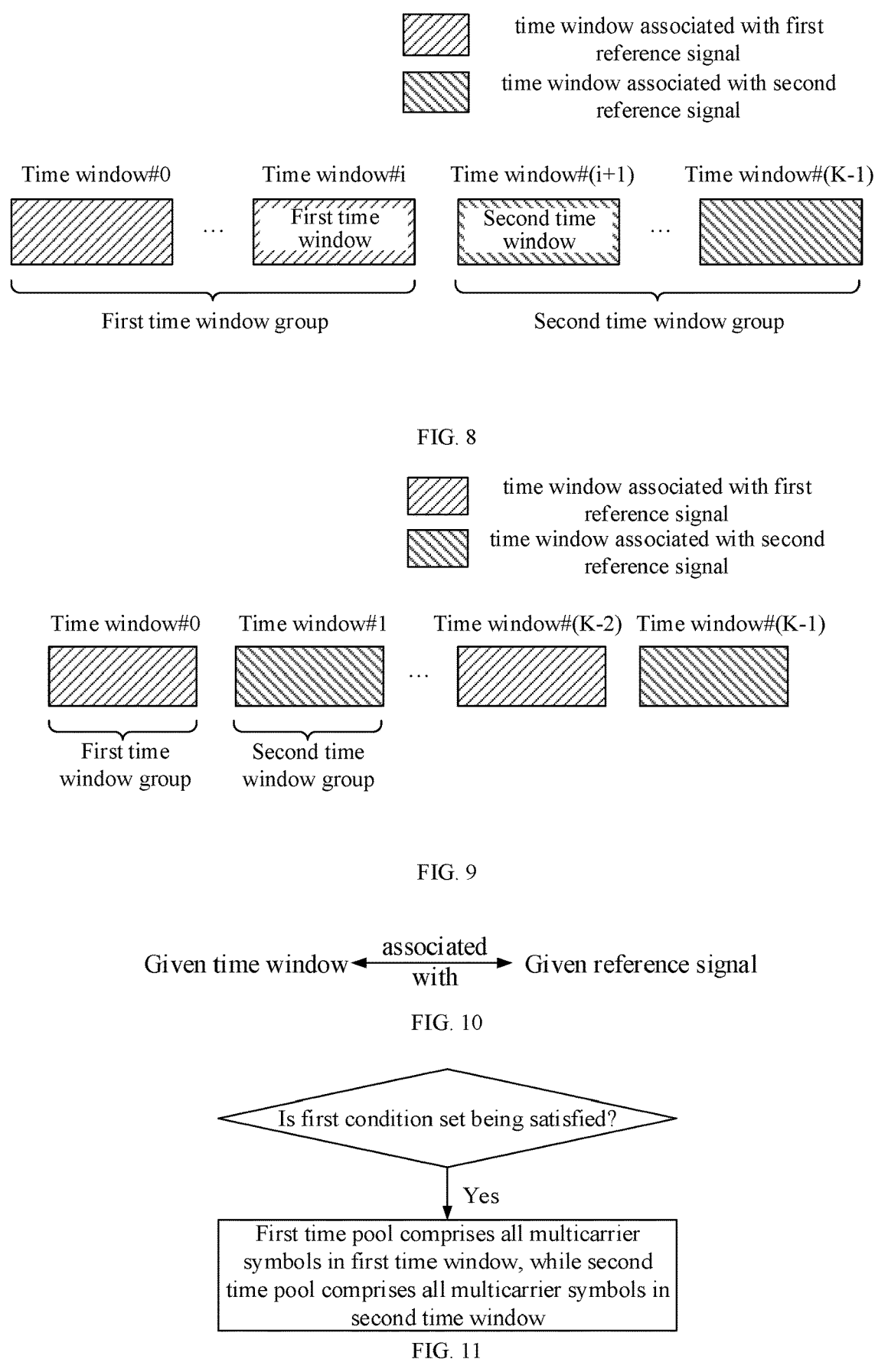

...        First time window        Second time window        ...

First time window group                    Second time window group

FIG. 8 time window associated with first reference signal time window associated with second reference signal Time window#0        Time window#1        Time window#(K-2)        Time window#(K-1)

...

First time window group        Second time window group

FIG. 9

Given time window ◄—— associated with ——► Given reference signal

FIG. 10

Is first condition set being satisfied?

Yes

First time pool comprises all multicarrier symbols in first time window, while second time pool comprises all multicarrier symbols in second time window

FIG. 11

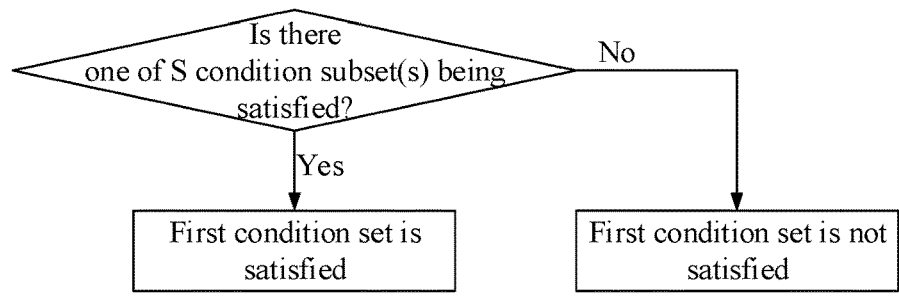

FIG. 12

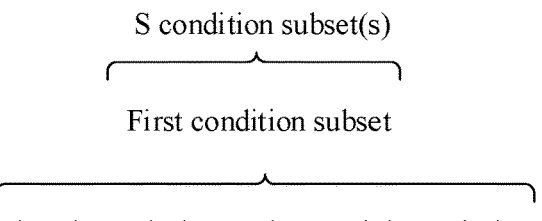

S condition subset(s)

First condition subset

First time window and second time window
are separated by time unit boundary

FIG. 13

S condition subset(s)

Second condition subset

The number of multicarrier symbols between
first time window and second time window is
no smaller than first value

FIG. 14

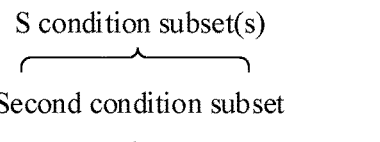

S condition subset(s)

Third condition subset

There is one multicarrier symbol between first time
window and second time window, of which the type
belongs to first type set

FIG. 15

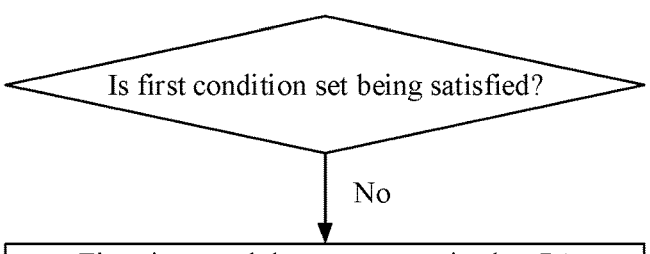

Is first condition set being satisfied?

No

First time pool does not comprise last P1 multicarrier symbol(s) in first time window, while second time pool does not comprise earliest P2 multicarrier symbol(s) in second time window

FIG. 16

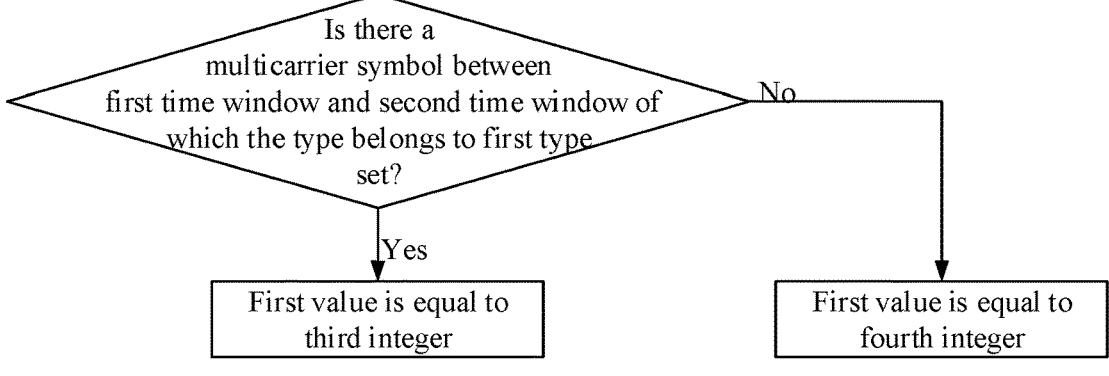

Is there a multicarrier symbol between first time window and second time window of which the type belongs to first type set?

No

Yes

First value is equal to third integer

First value is equal to fourth integer

FIG. 17

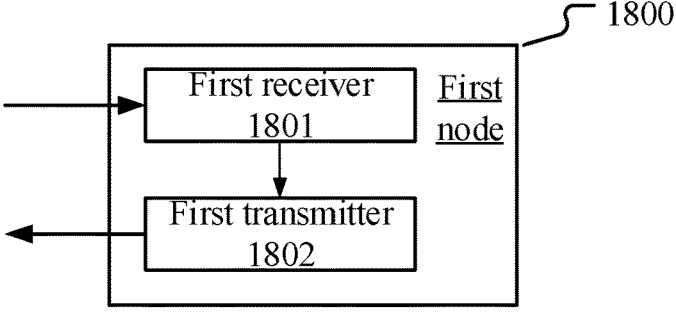

1800

First receiver 1801     First node

First transmitter 1802

FIG. 18

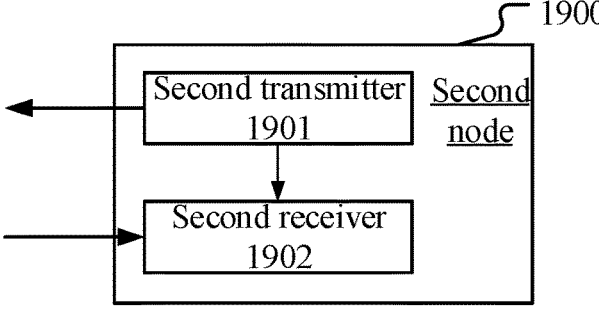

1900

Second transmitter 1901     Second node

Second receiver 1902

FIG. 19

USING SPATIAL DIFFERENCES BETWEEN TRANSMITTER RECEIVER POINTS (TRPs) TO OBTAIN EXTRA DIVERSITY GAINS

CROSS REFERENCE TO RELATED APPLICATIONS

This application is the continuation of the International patent application No. PCT/CN2021/102643, filed on Jun. 28, 2021, which claims the priority benefit of Chinese Patent Application No. 202010701550.1 filed on Jul. 20, 2020, the full disclosure of which is incorporated herein by reference.

BACKGROUND

Technical Field

The present application relates to transmission methods and devices in wireless communication systems, and in particular to a method and device for radio signal transmission in a wireless communication system supporting cellular networks.

Related Art

The Multi-antenna technique is a crucial part in the 3rd Generation Partner Project (3GPP) Long-term Evolution (LTE) and New Radio (NR) systems. More than one antenna can be configured, at the communication node, e.g., a base station or a User Equipment (UE), to obtain extra degree of freedom in space. Multiple antennas form through beam-forming a beam pointing in a specific direction to enhance the communication quality. When the multiple antennas belong to multiple Transmitter Receiver Points (TRPs)/panels, spatial differences between TRPs/panels can be taken advantage of to obtain extra diversity gains. In NR Release (R)16, multi-TRP based transmission is used to increase the reliability of downlink physical layer data channel transmission.

SUMMARY

In NR R17 and follow-up versions, the multi-TRP/panel-based transmission scheme will continue to be evolved, of which an important aspect is for enhancing uplink physical layer data channel. Similar to the case of downlink physical layer data channel, using beams for different TRPs/panels in repetitions of transmission can enhance the transmission reliability of the uplink physical layer data channel. A period of processing time is required for performing handover between beams for different TRPs/panels, which poses new demand for time intervals between repetitions. To address the above problem, the present application provides a solution. It should be noted that the statement above takes multiple-TRP/panel scenarios only for example, and the present application also applies to other scenarios, such as those using single-TRP/panel, where similar technical effects can be achieved. Additionally, the adoption of a unified solution for various scenarios, including but not limited to multi-TRP/panel and single-TRP/panel scenarios, contributes to the reduction of hardcore complexity and costs. In the case of no conflict, the embodiments of a first node and the characteristics in the embodiments may be applied to a second node, and vice versa. What's more, the embodiments in the present application and the characteristics in the embodiments can be arbitrarily combined if there is no conflict.

The present application provides a method in a first node for wireless communications, comprising:

receiving a first signaling;

transmitting a first signal in a first time pool; and transmitting a second signal in a second time pool;

herein, the first signaling is used to determine K time windows, K being a positive integer greater than 1; the first signal and the second signal both carry a first bit block; any one of the K time windows is associated with one of a first reference signal or a second reference signal, the first signaling being used to determine the first reference signal and the second reference signal; the first time pool comprises all or partial multicarrier symbols in one or multiple time windows being associated with the first reference signal among the K time windows, while the second time pool comprises all or partial multicarrier symbols in one or multiple time windows being associated with the second reference signal among the K time windows; a first time window and a second time window are respectively two time windows that are adjacent among the K time windows, the first time window and the second time window being respectively associated with the first reference signal and the second reference signal; the first time pool comprises all or partial multicarrier symbols in the first time window, while the second time pool comprises all or partial multicarrier symbols in the second time window; whether a first condition set is satisfied is used to determine at least one of:

whether the first time pool comprises all multicarrier symbols in the first time window; or whether the second time pool comprises all multicarrier symbols in the second time window.

In one embodiment, a problem to be solved in the present application includes: how to meet with the processing time required for inter-beam handover in uplink transmission based on multiple TRPs/panels. The method provided above addresses the issue by dropping transmitting signals on partial multicarrier symbols reserved for uplink transmission.

In one embodiment, a problem to be solved in the present application includes: how to avoid waste of resources due to the satisfaction of requirement of processing time for beam handover. By judging whether the requirement of processing time for beam handover has been satisfied between two repetitions, the above-mentioned method determines whether transmitting signals on partial multicarrier symbols reserved for uplink transmission will be dropped, thus solving this problem.

In one embodiment, characteristics of the above method include: the first condition set is used for judging whether the requirement of processing time for beam handover has been fulfilled between two repetitions of transmission.

In one embodiment, an advantage of the above method includes: ensuring the satisfaction of processing time for beam handover, the avoidance of resource waste and an enhancement of the resource utilization ratio.

According to one aspect of the present application, characterized in that the first condition set comprises S condition subset(s), S being a positive integer; when one of the S condition subset(s) is satisfied, the first condition set is satisfied; when each of the S condition subset(s) is not satisfied, the first condition set is not satisfied.

According to one aspect of the present application, characterized in that a first condition subset is one of the S condition subset(s), the first condition subset comprising:

the first time window and the second time window being separated by a time unit boundary.

According to one aspect of the present application, characterized in that a second condition subset is one of the S condition subset(s), the first condition subset comprising: the number of multicarrier symbol(s) between the first time window and the second time window being no smaller than a first value, the first value being a non-negative integer.

According to one aspect of the present application, characterized in that a third condition subset is one of the S condition subset(s), the first condition subset comprising: between the first time window and the second time window there exists one multicarrier symbol of which a type belongs to a first type set.

According to one aspect of the present application, characterized in that when the first condition set is not satisfied, the first time pool does not comprise last P1 multicarrier symbol(s) in the first time window, and the second time pool does not comprise earliest P2 multicarrier symbol(s) in the second time window, where P1 and P2 are non-negative integers, respectively, a sum of P1 and P2 is equal to P, P being a positive integer; at least one of a number of multicarrier symbols comprised in the first time window or a number of multicarrier symbols comprised in the second time window is used to determine a value of P1 and a value of P2.

According to one aspect of the present application, characterized in that whether there exists one multicarrier symbol between the first time window and the second time window of which a type belongs to a first type set is used to determine a first value, the first value being a non-negative integer; a number of multicarrier symbol(s) between the first time pool and the second time pool is no smaller than the first value.

According to one aspect of the present application, the first node is a UE.

According to one aspect of the present application, the first node is a relay node.

The present application provides a method in a second node for wireless communications, comprising:

transmitting a first signaling;

receiving a first signal in a first time pool; and receiving a second signal in a second time pool;

herein, the first signaling is used to determine K time windows, K being a positive integer greater than 1; the first signal and the second signal both carry a first bit block; any one of the K time windows is associated with one of a first reference signal or a second reference signal, the first signaling being used to determine the first reference signal and the second reference signal; the first time pool comprises all or partial multicarrier symbols in one or multiple time windows being associated with the first reference signal among the K time windows, while the second time pool comprises all or partial multicarrier symbols in one or multiple time windows being associated with the second reference signal among the K time windows; a first time window and a second time window are respectively two time windows that are adjacent among the K time windows, the first time window and the second time window being respectively associated with the first reference signal and the second reference signal; the first time pool comprises all or partial multicarrier symbols in the first time window, while the second time pool comprises all or partial multicarrier symbols in the second time window; whether a first condition set is satisfied is used to determine at least one of:

whether the first time pool comprises all multicarrier symbols in the first time window; or whether the second time pool comprises all multicarrier symbols in the second time window.

According to one aspect of the present application, characterized in that the first condition set comprises S condition subset(s), S being a positive integer; when one of the S condition subset(s) is satisfied, the first condition set is satisfied; when each of the S condition subset(s) is not satisfied, the first condition set is not satisfied.

According to one aspect of the present application, characterized in that a first condition subset is one of the S condition subset(s), the first condition subset comprising: the first time window and the second time window being separated by a time unit boundary.

According to one aspect of the present application, characterized in that a second condition subset is one of the S condition subset(s), the first condition subset comprising: the number of multicarrier symbol(s) between the first time window and the second time window being no smaller than a first value, the first value being a non-negative integer.

According to one aspect of the present application, characterized in that a third condition subset is one of the S condition subset(s), the first condition subset comprising: between the first time window and the second time window there exists one multicarrier symbol of which a type belongs to a first type set.

According to one aspect of the present application, characterized in that when the first condition set is not satisfied, the first time pool does not comprise last P1 multicarrier symbol(s) in the first time window, and the second time pool does not comprise earliest P2 multicarrier symbol(s) in the second time window, where P1 and P2 are non-negative integers, respectively, a sum of P1 and P2 is equal to P, P being a positive integer; at least one of a number of multicarrier symbols comprised in the first time window or a number of multicarrier symbols comprised in the second time window is used to determine a value of P1 and a value of P2.

According to one aspect of the present application, characterized in that whether there exists one multicarrier symbol between the first time window and the second time window of which a type belongs to a first type set is used to determine a first value, the first value being a non-negative integer; a number of multicarrier symbol(s) between the first time pool and the second time pool is no smaller than the first value.

According to one aspect of the present application, the second node is a base station.

According to one aspect of the present application, the second node is a UE.

According to one aspect of the present application, the second node is a relay node.

The present application provides a first node for wireless communications, comprising:

a first receiver, receiving a first signaling; and a first transmitter, transmitting a first signal in a first time pool, and transmitting a second signal in a second time pool;

herein, the first signaling is used to determine K time windows, K being a positive integer greater than 1; the first signal and the second signal both carry a first bit block; any one of the K time windows is associated with one of a first reference signal or a second reference signal, the first signaling being used to determine the first reference signal and the second reference signal; the first time pool comprises all or partial multicarrier symbols in one or multiple time windows being associated with the first reference signal among the K time windows, while the second time pool comprises all or partial multicarrier symbols in one or multiple time windows being associated with the second reference signal among the K time windows; a first time window and a second time window are respectively two time windows that are adjacent among the K time windows, the first time window and the second time window being respectively associated with the first reference signal and the second reference signal; the first time pool comprises all or partial multicarrier symbols in the first time window, while the second time pool comprises all or partial multicarrier symbols in the second time window; whether a first condition set is satisfied is used to determine at least one of:

whether the first time pool comprises all multicarrier symbols in the first time window; or whether the second time pool comprises all multicarrier symbols in the second time window.

The present application provides a second node for wireless communications, comprising:

a second transmitter, transmitting a first signaling; and a second receiver, receiving a first signal in a first time pool, and receiving a second signal in a second time pool;

herein, the first signaling is used to determine K time windows, K being a positive integer greater than 1; the first signal and the second signal both carry a first bit block; any one of the K time windows is associated with one of a first reference signal or a second reference signal, the first signaling being used to determine the first reference signal and the second reference signal; the first time pool comprises all or partial multicarrier symbols in one or multiple time windows being associated with the first reference signal among the K time windows, while the second time pool comprises all or partial multicarrier symbols in one or multiple time windows being associated with the second reference signal among the K time windows; a first time window and a second time window are respectively two time windows that are adjacent among the K time windows, the first time window and the second time window being respectively associated with the first reference signal and the second reference signal; the first time pool comprises all or partial multicarrier symbols in the first time window, while the second time pool comprises all or partial multicarrier symbols in the second time window; whether a first condition set is satisfied is used to determine at least one of:

whether the first time pool comprises all multicarrier symbols in the first time window; or whether the second time pool comprises all multicarrier symbols in the second time window.

In one embodiment, compared with the prior art, the present application is advantageous in the following aspects:

not only meeting the requirement of processing time for beam handover but also avoiding resource wastes and increasing the resource utilization ratio in the multi-TRP/panel-based uplink transmission.

BRIEF DESCRIPTION OF THE DRAWINGS

Other features, objects and advantages of the present application will become more apparent from the detailed description of non-restrictive embodiments taken in conjunction with the following drawings:

FIG. 4 illustrates a schematic diagram of a first communication device and a second communication device according to one embodiment of the present application.

FIG. 5 illustrates a flowchart of transmission according to one embodiment of the present application.

FIG. 6 illustrates a schematic diagram of a first signaling being used to determine K time windows according to one embodiment of the present application.

FIG. 7 illustrates a schematic diagram of a first signaling being used to determine K time windows according to one embodiment of the present application.

FIG. 8 illustrates a schematic diagram of a first time pool, a second time pool and K time windows according to one embodiment of the present application.

FIG. 9 illustrates a schematic diagram of a first time pool, a second time pool and K time windows according to one embodiment of the present application.

FIG. 10 illustrates a schematic diagram of a given time window and a given reference signal being associated according to one embodiment of the present application.

FIG. 11 illustrates a schematic diagram of how a first condition set relates to whether a first time pool comprises all multicarrier symbols in a first time window and whether a second time pool comprises all multicarrier symbols in a second time window according to one embodiment of the present application.

FIG. 12 illustrates a schematic diagram of a first condition set and S condition subset(s) according to one embodiment of the present application.

FIG. 13 illustrates a schematic diagram of S condition subset(s) and a first condition subset according to one embodiment of the present application.

FIG. 14 illustrates a schematic diagram of S condition subset(s) and a second condition subset according to one embodiment of the present application.

FIG. 15 illustrates a schematic diagram of S condition subset(s) and a third condition subset according to one embodiment of the present application.

FIG. 16 illustrates a schematic diagram showing when a first condition set is not satisfied, a first time pool does not comprise last P1 multicarrier symbol(s) in a first time window and a second time pool does not comprise earliest P2 multicarrier symbol(s) in a second time window according to one embodiment of the present application.

FIG. 17 illustrates a schematic diagram of whether a multicarrier symbol of which the type belongs to a first type set exists between a first time window and a second time window is used to determine a first value according to one embodiment of the present application.

FIG. 18 illustrates a structure block diagram of a processing device in a first node according to one embodiment of the present application.

FIG. 19 illustrates a structure block diagram of a processing device used in a second node according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
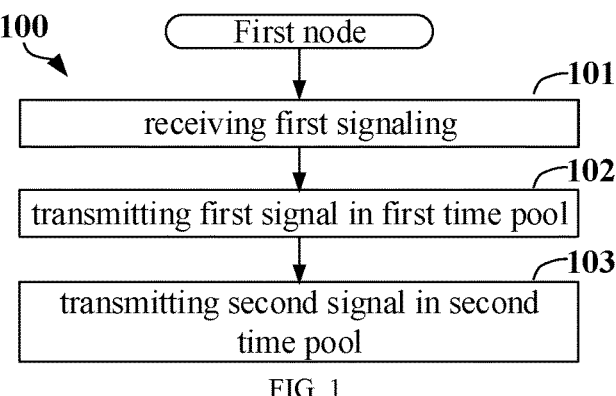
FIG. 1 illustrates a flowchart of a first signaling, a first signal and a second signal according to one embodiment of the present application.

Embodiment 1 illustrates a flowchart of a first signaling, a first signal and a second signal according to one embodiment of the present application, as shown in FIG. 1. In 100 illustrated by FIG. 1, each box represents a step. Particularly, the sequential step arrangement in each box herein does not imply a chronological order of steps marked respectively by these boxes.

In Embodiment 1, the first node in the present application receives a first signaling in step 101; transmits a first signal in a first time pool in step 102; and transmits a second signal in a second time pool in step 103; herein, the first signaling is used to determine K time windows, K being a positive integer greater than 1; the first signal and the second signal both carry a first bit block; any one of the K time windows is associated with one of a first reference signal or a second reference signal, the first signaling being used to determine the first reference signal and the second reference signal; the first time pool comprises all or partial multicarrier symbols in one or multiple time windows being associated with the first reference signal among the K time windows, while the second time pool comprises all or partial multicarrier symbols in one or multiple time windows being associated with the second reference signal among the K time windows; a first time window and a second time window are respectively two time windows that are adjacent among the K time windows, the first time window and the second time window being respectively associated with the first reference signal and the second reference signal; the first time pool comprises all or partial multicarrier symbols in the first time window, while the second time pool comprises all or partial multicarrier symbols in the second time window; whether a first condition set is satisfied is used to determine at least one of:

whether the first time pool comprises all multicarrier symbols in the first time window; or whether the second time pool comprises all multicarrier symbols in the second time window.

In one embodiment, the first signaling comprises a physical-layer signaling.

In one embodiment, the first signaling comprises a dynamic signaling.

In one embodiment, the first signaling comprises a layer 1 (L1) signaling.

In one embodiment, the first signaling comprises a layer 1 (L1) control signaling.

In one embodiment, the first signaling comprises Downlink Control Information (DCI).

In one embodiment, the first signaling comprises one or more fields in a DCI.

In one embodiment, the first signaling comprises one or more fields in a piece of Sidelink Control Information (SCI).

In one embodiment, the first signaling comprises UpLink Grant DCI.

In one embodiment, the first signaling comprises DCI for Configured Uplink Grant Type 2 activation.

In one embodiment, the first signaling comprises a Higher Layer signaling.

In one embodiment, the first signaling comprises a Radio Resource Control (RRC) signaling.

In one embodiment, the first signaling comprises a Medium Access Control layer Control Element (MAC CE) signaling.

In one embodiment, the first signaling comprises information in one or more fields in an Information Element (IE).

In one embodiment, the first signaling comprises scheduling information of the first signal and the second signal.

In one embodiment, the scheduling information comprises one or more of time-domain resource, frequency-domain resource, a Modulation and Coding Scheme (MCS), a DeModulation Reference Signal (DMRS) port, a Hybrid Automatic Repeat reQuest (HARQ) process number, a Redundancy Version (RV) or a New Data Indicator (NDI).

In one embodiment, the first signaling explicitly indicates the K time windows.

In one embodiment, the first signaling implicitly indicates the K time windows.

In one embodiment, information indicated by the first signaling is used to infer the K time windows.

In one embodiment, the multicarrier symbol includes an Orthogonal Frequency Division Multiplexing (OFDM) Symbol.

In one embodiment, the multicarrier symbol includes a Single Carrier-Frequency Division Multiple Access (SC-FDMA) symbol.

In one embodiment, the multicarrier symbol includes a Discrete Fourier Transform Spread OFDM (DFT-S-OFDM) symbol.

In one embodiment, the first reference signal comprises a Channel State Information-Reference Signal (CSI-RS).

In one embodiment, the first reference signal comprises a Synchronisation Signal/physical broadcast channel Block (SSB).

In one embodiment, the first reference signal comprises a Sounding Reference Signal (SRS).

In one embodiment, the second reference signal comprises a CSI-RS.

In one embodiment, the second reference signal comprises an SSB.

In one embodiment, the second reference signal comprises an SRS.

In one embodiment, the first reference signal and the second reference signal are not Quasi-Co-Located (QCL).

In one embodiment, the first reference signal and the second reference signal are not QCL corresponding to QCL-TypeD.

In one embodiment, the first signaling indicates the first reference signal and the second reference signal.

In one embodiment, the first signaling comprises a third field, and the third field in the first signaling indicates the first reference signal and the second reference signal.

In one embodiment, the third field comprises more than one bit.

In one embodiment, the third field comprises all or partial information in an SRS resource indicator field.

In one embodiment, the third field in the first signaling indicates a Transmission Configuration Indicator (TCI) codepoint corresponding to the first reference signal and a TCI codepoint corresponding to the second reference signal.

In one embodiment, the first reference signal and the second reference signal correspond to a same TCI codepoint.

In one embodiment, the first reference signal and the second reference signal correspond to different TCI codepoints.

In one embodiment, the third field in the first signaling indicates an SRS resource indicator (SRI) codepoint corresponding to the first reference signal and an SRI codepoint corresponding to the second reference signal.

In one embodiment, the first reference signal and the second reference signal correspond to a same SRI codepoint.

In one embodiment, the first reference signal and the second reference signal correspond to different SRI codepoints.

In one embodiment, time-frequency resources occupied by the first signaling are used to determine the first reference signal and the second reference signal.

In one embodiment, a DCI format of the first signaling is used to determine the first reference signal and the second reference signal.

In one embodiment, any time window among the K time windows is a contiguous period of time.

In one embodiment, any time window among the K time windows comprises a positive integer number of multicarrier symbol(s).

In one embodiment, any time window among the K time windows comprises one or multiple consecutive multicarrier symbols.

In one embodiment, any time window among the K time windows comprises one slot.

In one embodiment, any time window among the K time windows comprises a positive integer number of slot(s).

In one embodiment, any time window among the K time windows comprises one sub-slot.

In one embodiment, any time window among the K time windows is of a length no larger than 1 slot.

In one embodiment, the K time windows are mutually orthogonal.

In one embodiment, there are two time windows among the K time windows in which the numbers of multicarrier symbols comprised are unequal.

In one embodiment, there are two time windows among the K time windows in which the numbers of multicarrier symbols comprised are equal.

In one embodiment, there is one time window among the K time windows that only comprises one multicarrier symbol.

In one embodiment, there is one time window among the K time windows that comprises multiple multicarrier symbols.

In one embodiment, any time window among the K time windows comprises more than one multicarrier symbol.

In one embodiment, the K time windows are consecutive in time domain.

In one embodiment, the K time windows are non-consecutive in time domain.

In one embodiment, the first time window is an i-th time window among the K time windows, and the second time window is a (i+1)-th time window among the K time windows, i being a positive integer less than K.

In one embodiment, positions of the first time window and the second time window are adjacent in the K time windows.

In one embodiment, the K time windows are respectively reserved for K repetitions of the first bit block.

In one embodiment, the K repetitions of the first bit block are K actual repetitions.

In one embodiment, among the K repetitions of the first bit block there is one repetition occupying all multicarrier symbols in a corresponding time window.

In one embodiment, among the K repetitions of the first bit block there is one repetition occupying only partial multicarrier symbols in a corresponding time window.

In one embodiment, the K repetitions of the first bit block occupy the same frequency-domain resources.

In one embodiment, among the K repetitions of the first bit block there are two repetitions occupying different frequency-domain resources.

In one embodiment, the K repetitions of the first bit block belong to a same Bandwidth part (BWP) in frequency domain.

In one embodiment, the K repetitions of the first bit block belong to a same serving cell in frequency domain.

In one embodiment, any one of the K repetitions of the first bit block is transmitted on a Physical Uplink Shared CHannel (PUSCH).

In one embodiment, among the K time windows there isn't any time window located between the first time window and the second time window in time domain.

In one embodiment, an end of the first time window is no later than a start of the second time window.

In one embodiment, for any two adjacent time windows among the K time windows, if there is at least one multicarrier symbol between the two adjacent time windows, the first node does not transmit radio signal(s) in a serving cell to which the first signal belongs within any said multicarrier symbol between the two adjacent time windows.

In one embodiment, for any two adjacent time windows among the K time windows, if there is at least one multicarrier symbol between the two adjacent time windows, the first node does not transmit radio signal(s) carrying the first bit block in a serving cell to which the first signal belongs within any said multicarrier symbol between the two adjacent time windows.

In one embodiment, a given time pool comprises a positive integer number of period(s) of time; any period comprised in the given time pool is contiguous in time domain.

In one embodiment, a given time pool comprises multiple periods of time; the multiple periods of time are non-consecutive.

In one embodiment, a given time pool only comprises one period of time.

In one embodiment, a given time pool comprises a positive integer number of multicarrier symbol(s).

In one embodiment, multicarrier symbols comprised in a given time pool are non-consecutive in time domain.

In one embodiment, multicarrier symbols comprised in a given time pool are consecutive in time domain.

In one embodiment, a given time pool comprises all or partial time-domain resources in some time windows among the K time windows.

In one embodiment, a given time pool consists of all or partial time-domain resources in some time windows among the K time windows.

In one embodiment, the given time pool is the first time pool or the second time pool.

In one embodiment, the given time pool is the first time pool.

In one embodiment, the given time pool is the second time pool.

In one embodiment, the first time pool comprises all multicarrier symbols in the first time window.

In one embodiment, the first time pool comprises only partial multicarrier symbols in the first time window.

In one embodiment, the second time pool comprises all multicarrier symbols in the second time window.

In one embodiment, the second time pool comprises only partial multicarrier symbols in the second time window.

In one embodiment, the first time pool and the second time pool are mutually orthogonal in time domain.

In one embodiment, an end time of the first time pool is no later than a start time of the second time pool.

In one embodiment, an end time of the first time pool is no later than an end of the first time window.

In one embodiment, a start time of the second time pool is no earlier than a start of the second time window.

In one embodiment, the first time pool consists of all or partial multicarrier symbols in one or more time windows being associated with the first reference signal among the K time windows, while the second time pool consists of all or partial multicarrier symbols in one or more time windows being associated with the second reference signal among the K time windows.

In one embodiment, the first signal and the second signal respectively comprise a baseband signal.

In one embodiment, the first signal and the second signal respectively comprise a radio signal.

In one embodiment, the first signal and the second signal respectively comprise a radio frequency (RF) signal.

In one embodiment, the first signal and the second signal respectively comprise two repetitions of transmission of the first bit block.

In one embodiment, the first signal and the second signal respectively comprise two actual repetitions of transmission of the first bit block.

In one embodiment, the first signal occupies all time-domain resources in the first time pool.

In one embodiment, the second signal occupies all time-domain resources in the second time pool.

In one embodiment, the first signal and the second signal belong to a same BWP in frequency domain.

In one embodiment, the first signal and the second signal belong to a same serving cell in frequency domain.

In one embodiment, the first bit block comprises more than one bit.

In one embodiment, all bits in the first bit block are sequentially arranged.

In one embodiment, the first bit block comprises a Transport Block (TB).

In one embodiment, the first bit block comprises a Code Block (CB).

In one embodiment, the first bit block comprises a Code Block Group (CBG).

In one embodiment, the first signaling is used to determine a number of bits comprised in the first bit block.

In one embodiment, the sentence that the first signal and the second signal both carry a first bit block means that the first signal and the second signal respectively comprise an output by bits in the first bit block sequentially through Cyclic Redundancy Check (CRC) Attachment, Code Block Segmentation, Code Block CRC Attachment, Channel Coding, Rate Matching, and Concatenation, Scrambling, Modulation, Layer Mapping, transform precoding, Precoding, Mapping to Virtual Resource Blocks, and Mapping from Virtual to Physical Resource Blocks, and Multicarrier symbol Generation, as well as Modulation and Upconversion.

In one embodiment, the sentence that the first signal and the second signal both carry a first bit block means that the first signal and the second signal respectively comprise an output by bits in the first bit block sequentially through CRC Attachment, Channel Coding, Rate Matching, Modulation, Layer Mapping, and Precoding, Mapping to Virtual Resource Blocks, and Mapping from Virtual to Physical Resource Blocks, and Multicarrier symbol Generation, as well as Modulation and Upconversion.

In one embodiment, the sentence that the first signal and the second signal both carry a first bit block means that the first bit block is used for generating the first signal and the second signal.

In one embodiment, the first condition set is related to whether there exists a time unit interval between the first time window and the second time window.

In one embodiment, the first condition set is related to whether there exists (a) multicarrier symbol(s) between the first time window and the second time window.

In one embodiment, the first condition set is related to a number of multicarrier symbol(s) between the first time window and the second time window.

In one embodiment, the first condition set is related to a type of multicarrier symbol(s) between the first time window and the second time window.

In one embodiment, the first condition set comprises: the first time window and the second time window being separated by a time unit boundary.

In one embodiment, the first condition set comprises: the first time window and the second time window being separated by a time unit boundary, and at the time unit boundary separating the first time window and the second time window a transform from a first-type multicarrier symbol to a second-type multicarrier symbol occurs.

In one embodiment, the first condition set comprises: a number of multicarrier symbol(s) existing between the first time window and the second time window is no smaller than a first value, the first value being a non-negative integer.

In one embodiment, the first condition set comprises: between the first time window and the second time window there exists one multicarrier symbol of which a type belongs to a first type set.

In one embodiment, the first condition set comprises: the first node is not configured with a first higher-layer parameter.

In one embodiment, the first higher-layer parameter indicates the first value.

In one embodiment, a name of the first higher-layer parameter includes StartingSymbolOffset.

In one embodiment, a higher layer signaling configuring the first higher-layer parameter comprises information in all or partial fields in a RepetitionSchemeConfig IE.

In one embodiment, when the first time pool comprises only partial multicarrier symbols in the first time window, the first node drops transmitting signal(s) in multicarrier symbol(s) in the first time window not belonging to the first time pool.

In one embodiment, when the second time pool comprises only partial multicarrier symbols in the second time window, the first node drops transmitting signal(s) in multicarrier symbol(s) in the second time window not belonging to the second time pool.

In one embodiment, when the first time pool comprises only partial multicarrier symbols in the first time window, the first node drops transmitting signal(s) carrying the first bit block in multicarrier symbol(s) in the first time window not belonging to the first time pool.

In one embodiment, when the second time pool comprises only partial multicarrier symbols in the second time window, the first node drops transmitting signal(s) carrying the first bit block in multicarrier symbol(s) in the second time window not belonging to the second time pool.

Embodiment 2

Figure 2:
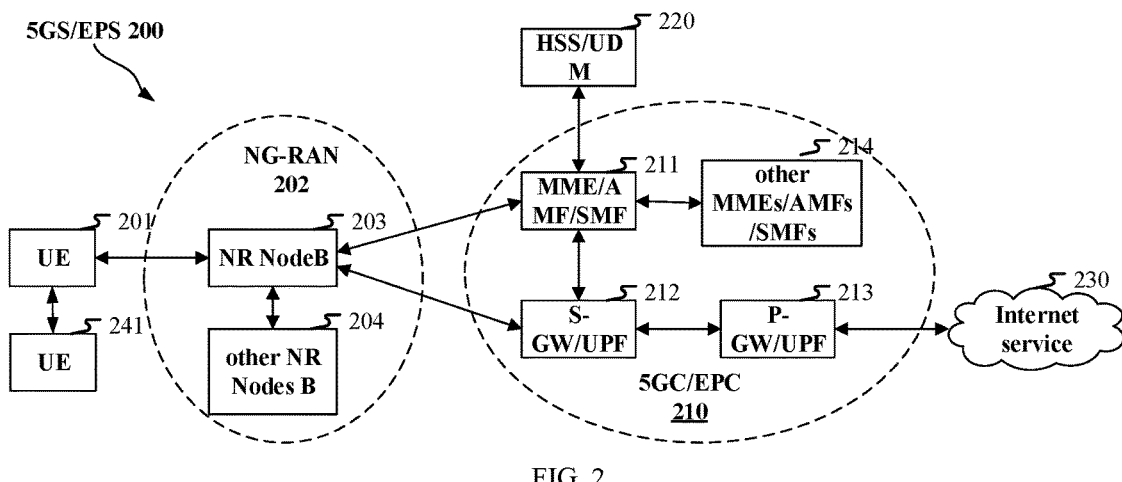
FIG. 2 illustrates a schematic diagram of a network architecture according to one embodiment of the present application.

Embodiment 2 illustrates a schematic diagram of a network architecture according to one embodiment of the present application, as shown in FIG. 2.

FIG. 2 is a diagram illustrating a network architecture of Long-Term Evolution (LTE), Long-Term Evolution Advanced (LTE-A) and future 5G systems. The LTE, or LTE-A or future 5G network architecture 200 may be called an Evolved Packet System (EPS) 200. The 5G NR or LTE network 200 can be called a 5G System/Evolved Packet System (5GS/EPS) 200 or other appropriate terms. The 5GS/EPS 200 may comprise one or more UEs 201, a UE 241 in sidelink communication with the UE(s) 201, an NG-RAN 202, a 5G CoreNetwork/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN202 comprises a New Radio (NR) node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning System (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching (PS) services.

In one embodiment, the first node in the present application includes the UE 201.

In one embodiment, the first node in the present application includes the UE 241.

In one embodiment, the second node in the present application includes the gNB203.

In one embodiment, the second node in the present application includes the UE 241.

In one embodiment, a radio link between the UE201 and the gNB203 is a cellular link.

In one embodiment, a radio link between the UE201 and the UE241 is a sidelink.

In one embodiment, a transmitter for the first signaling in the present application includes the gNB203.

In one embodiment, a receiver for the first signaling in the present application includes the UE201.

In one embodiment, a transmitter for the first signal in the present application includes the UE201.

In one embodiment, a receiver for the first signal in the present application includes the gNB203.

In one embodiment, a transmitter for the second signal in the present application includes the UE201.

In one embodiment, a receiver for the second signal in the present application includes the gNB203.

Embodiment 3

Figure 3:
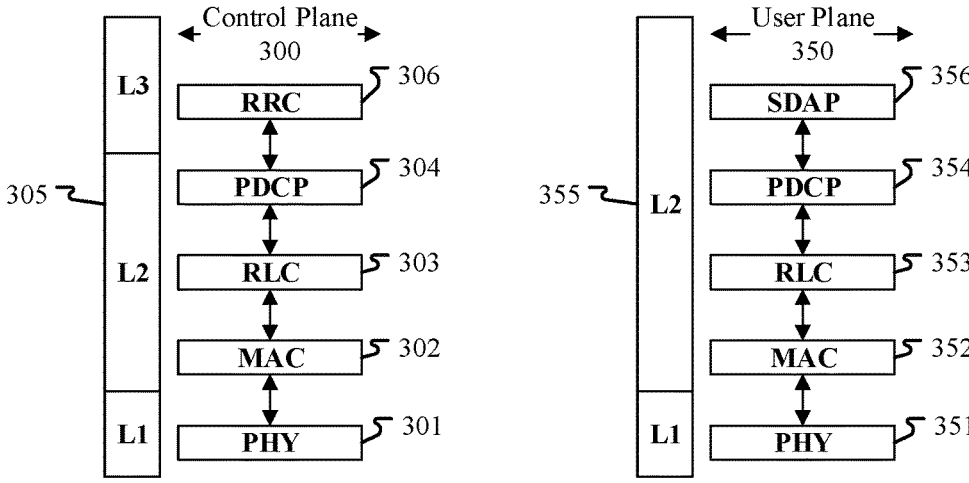
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to the present application, as shown in FIG. 3.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between the first communication node and the second communication node or between two UEs. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first signaling is generated by the PHY 301, or the PHY 351.

In one embodiment, the first signaling is generated by the MAC sublayer 352, or the MAC sublayer 302.

In one embodiment, the first signal is generated by the PHY 301, or the PHY 351.

In one embodiment, the second signal is generated by the PHY 301, or the PHY 351.

Embodiment 4

Embodiment 4 illustrates a schematic diagram of a first communication device and a second communication device according to one embodiment of the present application, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In DL, the controller/processor 475 provides header compression, encryption, packet segmentation and reordering, multiplexing between a logical channel and a transport channel and radio resource allocation of the second communication device 450 based on various priorities. The controller/processor 475 is responsible for HARQ operation, retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the constellation mapping corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more parallel streams. The transmitting processor 416 then maps each parallel stream into a subcarrier. The modulated symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any parallel stream targeting the second communication device 450. Symbols on each parallel stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In DL transmission, the controller/processor 459 provides de-multiplexing between a transport channel and a logical channel, packet reassembling, decryption, header decompression, control signal processing so as to recover a higher-layer packet from the core network. The higher-layer packet is later provided to all protocol layers above the L2 layer. Or various control signals can be provided to the L3 for processing. The controller/processor 459 is also in charge of using ACK and/or NACK protocols for error detection as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL, the controller/processor 459 performs header compression, encryption, packet segmentation and reordering, and multiplexing between a logical channel and a transport channel based on radio resource allocation for the first communication device 410 so as to provide the L2 layer functions used for the user plane and the control plane. The controller/processor 459 is responsible for HARQ operation, retransmission of a lost packet and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated parallel streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. The controller/processor 475 provides demultiplexing between a transport channel and a logical channel, packet reassembling, decryption, header decompression and control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication node 450 comprises at least one processor and at least one memory, the at least one memory comprises computer program codes; the at least one memory and the computer program codes are configured to be used in collaboration with the at least one processor. The second communication device 450 at least: receives the first signaling; and transmits the first signal in the first time pool; and transmits the second signal in the second time pool; herein, the first signaling is used to determine K time windows, K being a positive integer greater than 1; the first signal and the second signal both carry a first bit block; any one of the K time windows is associated with one of a first reference signal or a second reference signal, the first signaling being used to determine the first reference signal and the second reference signal; the first time pool comprises all or partial multicarrier symbols in one or multiple time windows being associated with the first reference signal among the K time windows, while the second time pool comprises all or partial multicarrier symbols in one or multiple time windows being associated with the second reference signal among the K time windows; a first time window and a second time window are respectively two time windows that are adjacent among the K time windows, the first time window and the second time window being respectively associated with the first reference signal and the second reference signal; the first time pool comprises all or partial multicarrier symbols in the first time window, while the second time pool comprises all or partial multicarrier symbols in the second time window; whether a first condition set is satisfied is used to determine at least one of:

whether the first time pool comprises all multicarrier symbols in the first time window; or whether the second time pool comprises all multicarrier symbols in the second time window.

In one embodiment, the second communication node 450 comprises a memory that stores a computer readable instruction program, the computer readable instruction program generates actions when executed by at least one processor, which include: receiving the first signaling; and transmitting the first signal in the first time pool; and transmitting the second signal in the second time pool; herein, the first signaling is used to determine K time windows, K being a positive integer greater than 1; the first signal and the second signal both carry a first bit block; any one of the K time windows is associated with one of a first reference signal or a second reference signal, the first signaling being used to determine the first reference signal and the second reference signal; the first time pool comprises all or partial multicarrier symbols in one or multiple time windows being associated with the first reference signal among the K time windows, while the second time pool comprises all or partial multicarrier symbols in one or multiple time windows being associated with the second reference signal among the K time windows; a first time window and a second time window are respectively two time windows that are adjacent among the K time windows, the first time window and the second time window being respectively associated with the first reference signal and the second reference signal; the first time pool comprises all or partial multicarrier symbols in the first time window, while the second time pool comprises all or partial multicarrier symbols in the second time window; whether a first condition set is satisfied is used to determine at least one of:

whether the first time pool comprises all multicarrier symbols in the first time window; or whether the second time pool comprises all multicarrier symbols in the second time window.

In one embodiment, the first communication device 410 comprises at least one processor and at least one memory, the at least one memory comprises computer program codes; the at least one memory and the computer program codes are configured to be used in collaboration with the at least one processor. The first communication device 410 at least:

transmits the first signaling; and receives the first signal in the first time pool; and receives the second signal in the second time pool; herein, the first signaling is used to determine K time windows, K being a positive integer greater than 1; the first signal and the second signal both carry a first bit block; any one of the K time windows is associated with one of a first reference signal or a second reference signal, the first signaling being used to determine the first reference signal and the second reference signal; the first time pool comprises all or partial multicarrier symbols in one or multiple time windows being associated with the first reference signal among the K time windows, while the second time pool comprises all or partial multicarrier symbols in one or multiple time windows being associated with the second reference signal among the K time windows; a first time window and a second time window are respectively two time windows that are adjacent among the K time windows, the first time window and the second time window being respectively associated with the first reference signal and the second reference signal; the first time pool comprises all or partial multicarrier symbols in the first time window, while the second time pool comprises all or partial multicarrier symbols in the second time window; whether a first condition set is satisfied is used to determine at least one of:

whether the first time pool comprises all multicarrier symbols in the first time window; or whether the second time pool comprises all multicarrier symbols in the second time window.

In one embodiment, the first communication device 410 comprises a memory that stores a computer readable instruction program, the computer readable instruction program generates actions when executed by at least one processor, which include: transmitting the first signaling; and receiving the first signal in the first time pool; and receiving the second signal in the second time pool; herein, the first signaling is used to determine K time windows, K being a positive integer greater than 1; the first signal and the second signal both carry a first bit block; any one of the K time windows is associated with one of a first reference signal or a second reference signal, the first signaling being used to determine the first reference signal and the second reference signal; the first time pool comprises all or partial multicarrier symbols in one or multiple time windows being associated with the first reference signal among the K time windows, while the second time pool comprises all or partial multicarrier symbols in one or multiple time windows being associated with the second reference signal among the K time windows; a first time window and a second time window are respectively two time windows that are adjacent among the K time windows, the first time window and the second time window being respectively associated with the first reference signal and the second reference signal; the first time pool comprises all or partial multicarrier symbols in the first time window, while the second time pool comprises all or partial multicarrier symbols in the second time window; whether a first condition set is satisfied is used to determine at least one of:

whether the first time pool comprises all multicarrier symbols in the first time window; or whether the second time pool comprises all multicarrier symbols in the second time window.

In one embodiment, the first node in the present application comprises the second communication device 450.

In one embodiment, the second node in the present application comprises the first communication device 410.

In one embodiment, at least one of the antenna 452, the receiver 454, the receiving processor 456, the multi-antenna receiving processor 458, the controller/processor 459, or the memory 460 is used to receive the first signaling; at least one of the antenna 420, the transmitter 418, the transmitting processor 416, the multi-antenna transmitting processor 471, the controller/processor 475 or the memory 476 is used to transmit the first signaling.

In one embodiment, at least one of the antenna 420, the receiver 418, the receiving processor 470, the multi-antenna receiving processor 472, the controller/processor 475 or the memory 476 is used to receive the first signal in the first time pool; at least one of the antenna 452, the transmitter 454, the transmitting processor 468, the multi-antenna transmitting processor 457, the controller/processor 459 or the memory 460 is used to transmit the first signal in the first time pool.

In one embodiment, at least one of the antenna 420, the receiver 418, the receiving processor 470, the multi-antenna receiving processor 472, the controller/processor 475 or the memory 476 is used to receive the second signal in the second time pool; at least one of the antenna 452, the transmitter 454, the transmitting processor 468, the multi-antenna transmitting processor 457, the controller/processor 459 or the memory 460 is used to transmit the second signal in the second time pool.

Embodiment 5

Embodiment 5 illustrates a flowchart of wireless transmission according to one embodiment of the present application, as shown in FIG. 5. In FIG. 5, a second node U1 and a first node U2 are communication nodes in communications via an air interface. In FIG. 5, steps marked by the box F51 are optional.

The second node U1 transmits a first signaling in step S511; receives a first signal in a first time pool in step S512; and receives a second signal in a second time pool in step S513; and receives sub-signal(s) not belonging to the first signal and the second signal among the K sub-signals in step S5101.

The first node U2 receives a first signaling in step S521; transmits a first signal in a first time pool in step S522; and transmits a second signal in a second time pool in step S523; and transmits sub-signal(s) not belonging to the first signal and the second signal among the K sub-signals in step S5201.

In Embodiment 5, the first signaling is used by the first node U2 to determine K time windows, K being a positive integer greater than 1; the first signal and the second signal both carry a first bit block; any one of the K time windows is associated with one of a first reference signal or a second reference signal, the first signaling being used by the first node U2 to determine the first reference signal and the second reference signal; the first time pool comprises all or partial multicarrier symbols in one or multiple time windows being associated with the first reference signal among the K time windows, while the second time pool comprises all or partial multicarrier symbols in one or multiple time windows being associated with the second reference signal among the K time windows; a first time window and a second time window are respectively two time windows that are adjacent among the K time windows, the first time window and the second time window being respectively associated with the first reference signal and the second reference signal; the first time pool comprises all or partial multicarrier symbols in the first time window, while the second time pool comprises all or partial multicarrier symbols in the second time window; whether a first condition set is satisfied is used by the first node U2 to determine at least one of:

whether the first time pool comprises all multicarrier symbols in the first time window; or whether the second time pool comprises all multicarrier symbols in the second time window.

In one embodiment, whether the first condition set is satisfied is used by the second node U1 to determine at least one of:

whether the first time pool comprises all multicarrier symbols in the first time window; or whether the second time pool comprises all multicarrier symbols in the second time window.

In one embodiment, the first node U2 is the first node in the present application.

In one embodiment, the second node U1 is the second node in the present application.

In one embodiment, an air interface between the second node U1 and the first node U2 includes a radio interface between a base station and a UE.

In one embodiment, an air interface between the second node U1 and the first node U2 includes a radio interface between a UE and another UE.

In one embodiment, the second node U1 is a maintenance base station for a serving cell of the first node U2.

In one embodiment, the first signaling is transmitted in a downlink physical layer control channel (i.e., a downlink channel only capable of bearing physical layer signaling).

In one embodiment, the first signaling is transmitted on a Physical Downlink Control Channel (PDCCH).

In one embodiment, the first signaling is transmitted on a Physical Sidelink Control Channel (PSCCH).

In one embodiment, the first signal and the second signal are respectively transmitted on an uplink physical layer data channel (i.e., a downlink channel capable of bearing physical layer data).

In one embodiment, the first signal and the second signal are respectively transmitted on a same Physical Uplink Shared Channel (PUSCH).

In one embodiment, the first signal and the second signal are respectively transmitted on different PUSCHs.

In one embodiment, the first signal is transmitted on one or more PUSCHs.

In one embodiment, the second signal is transmitted on one or more PUSCHs.

In one embodiment, the first signal and the second signal are respectively transmitted on a Physical Sidelink Shared Channel (PSSCH).

In one embodiment, the steps marked by the box F51 in FIG. 5 exist; the K time windows are respectively reserved for the K sub-signals; the K sub-signals respectively comprise the K repetitions of the first bit block; the first signal comprises each sub-signal comprised in the first time pool among the K sub-signals, while the second signal comprises each sub-signal comprised in the second time pool among the K sub-signals.

In one embodiment, there is a sub-signal among the K sub-signals that is earlier than the first signal in time domain.

In one embodiment, there is a sub-signal among the K sub-signals that is later than the second signal in time domain.

In one embodiment, there isn't any sub-signal among the K sub-signals being located between the first signal and the second signal in time domain.

In one embodiment, any one of the K sub-signals is transmitted on a PUSCH.

In one embodiment, the steps marked by the box F51 in FIG. 5 do not exist.

Embodiment 6

Embodiment 6 illustrates a schematic diagram of a first signaling being used to determine K time windows according to one embodiment of the present application; as shown in FIG. 6. In Embodiment 6, the first signaling comprises a first field, the first field in the first signaling indicating the K time windows.

In one embodiment, the first field comprises more than one bit.

In one embodiment, the first field comprises information in one or more fields in a DCI.

In one embodiment, the first field comprises information in one or more fields in an IE.

In one embodiment, the first field in the first signaling indicates a first Start and Length Indicator Value (SLIV), the first SLIV indicating a start of a first time window among the K time windows and a length of each of the K time windows.

In one embodiment, a multicarrier symbol firstly occupied by a first time window among the K time windows is a first multicarrier symbol in a first time unit, where the first field in the first signaling indicates a time interval between the first time unit and a time unit to which the first signaling belongs and a position of the first multicarrier symbol in the first time unit.

In one embodiment, the K time windows are respectively in K consecutive time units, respective positions of the K time windows in the K consecutive time units are the same.

In one embodiment, the first field in the first signaling indicates the K.

In one embodiment, a said time unit is a slot.

In one embodiment, a said time unit is a sub-slot.

In one embodiment, a said time unit is a multicarrier symbol.

In one embodiment, a said time unit consists of a positive integer number of consecutive multicarrier symbols.

In one embodiment, a number of multicarrier symbol(s) comprised in a said time unit is configured by an RRC signaling.

Embodiment 7

Embodiment 7 illustrates a schematic diagram of a first signaling being used to determine K time windows according to one embodiment of the present application; as shown in FIG. 7. In Embodiment 7, the first signaling comprises a second field, the second field in the first signaling indicating a first time slice set, the first time slice set comprising a positive integer number of time slice(s), where any time slice in the first time slice set is a contiguous period of time; the first time slice set is used to determine the K time windows.

In one embodiment, the second field comprises more than one bit.

In one embodiment, the second field comprises information in one or more fields in a DCI.

In one embodiment, the second field comprises information in one or more fields in an IE.

In one embodiment, the first time slice set only comprises one time slice.

In one embodiment, the first time slice set comprises multiple time slices.

In one embodiment, any time slice in the first time slice set comprises one or multiple consecutive multicarrier symbols.

In one embodiment, the numbers of multicarrier symbols comprised in any two time slices in the first time slice set are equal.

In one embodiment, the first time slice set comprises multiple time slices, the multiple time slices being mutually orthogonal.

In one embodiment, any two adjacent time slices in the first time slice set are consecutive in time domain.

In one embodiment, any time slice in the first time slice set is reserved for a nominal repetition of the first bit block.

In one embodiment, the second field in the first signaling indicates a second SLIV, the second SLIV indicating a start time of an earliest time slice in the first time slice set and a length of each time slice in the first time slice set.

In one embodiment, a multicarrier symbol firstly occupied by an earliest time slice in the first time slice set is a second multicarrier symbol in a second time unit, where the second field in the first signaling indicates a time interval between the second time unit and a time unit to which the first signaling belongs and a position of the second multicarrier symbol in the second time unit.

In one embodiment, the second field in the first signaling indicates a number of time slice(s) comprised in the first time slice set.

In one embodiment, any time window among the K time windows belongs to a time slice in the first time slice set.

In one embodiment, the first time slice set is used to determine the K.

In one embodiment, the first time slice set is used to determine a start of each time window among the K time windows.

In one embodiment, the first time slice set is used to determine a length of each time window among the K time windows.

In one embodiment, for any given time slice in the first time slice set, all multicarrier symbols in the given time slice not belonging to a first multicarrier symbol set constitute a first reference symbol set; if the number of multicarrier symbols available for PUSCH repetition type B transmission in the first reference symbol set is greater than 1, the first reference symbol set is used to determine a first time window subset in the K time windows; any time window in the first time window subset consists of one or multiple consecutive multicarrier symbols available for PUSCH repetition type B transmission in the first reference symbol set being located in a same time unit; any time window in the first time window subset is one of the K time windows.

In one subembodiment, the first time window subset comprises only one time window.

In one subembodiment, the first time window subset comprises multiple time windows.

In one subembodiment, the first multicarrier symbol set comprises one or more multicarrier symbols.

In one subembodiment, the first multicarrier symbol set is configured by an RRC signaling.

Embodiment 8

Embodiment 8 illustrates a schematic diagram of a first time pool, a second time pool and K time windows according to one embodiment of the present application; as shown in FIG. 8. In FIG. 8, indexes of the K time windows are #0, . . . and #(K−1), respectively; the i is a positive integer less than K−2. In Embodiment 8, the first time pool consists of all or partial multicarrier symbols in a first time window group, while the second time pool consists of all or partial multicarrier symbols in a second time window group; the first time window group comprises a positive integer number of time window(s) being associated with the first reference signal among the K time windows, while the second time window group comprises a positive integer number of time window(s) being associated with the second reference signal among the K time windows; the first time window is a last time window in the first time window group, while the second time window is an earliest time window in the second time window group.

In one embodiment, there isn't a time window among the K time windows that belongs to the first time window group and the second time window group at the same time.

In one embodiment, any time window in the first time window group belongs to the K time windows.

In one embodiment, any time window in the second time window group belongs to the K time windows.

In one embodiment, the first time window group comprises multiple time windows of the K time windows.

In one subembodiment, the multiple time windows are continuously located in the K time windows.

In one subembodiment, the multiple time windows are discontinuously located in the K time windows.

In one embodiment, the second time window group comprises multiple time windows of the K time windows.

In one subembodiment, the multiple time windows are continuously located in the K time windows.

In one subembodiment, the multiple time windows are discontinuously located in the K time windows.

In one embodiment, a sum of a number of time window(s) comprised in the first time window group and a number of time window(s) comprised in the second time window group is equal to K.

In one embodiment, an end of a last time window in the first time window group is earlier than a start of an earliest time window in the second time window group.

In one embodiment, a last time window in the first time window group and an earliest time window in the second time window group are adjacent to each other in the K time windows.

In one embodiment, the K time windows are respectively reserved for the K sub-signals; the K sub-signals respectively comprise the K repetitions of the first bit block; the first signal comprises each sub-signal comprised in the first time window group among the K sub-signals, while the second signal comprises each sub-signal comprised in the second time window group among the K sub-signals.

In one embodiment, any sub-signal in the first signal and the second signal comprises a baseband signal.

In one embodiment, any sub-signal in the first signal and the second signal comprises a radio signal.

In one embodiment, any sub-signal in the first signal and the second signal comprises a radio frequency signal.

In one embodiment, the first signal only comprises one sub-signal.

In one embodiment, the first signal comprises more than one sub-signal.

In one embodiment, the second signal only comprises one sub-signal.

In one embodiment, the second signal comprises more than one sub-signal.

In one embodiment, a number of time window(s) comprised in the first time window group is equal to a number of sub-signal(s) comprised in the first signal; a number of time window(s) comprised in the second time window group is equal to a number of sub-signal(s) comprised in the second signal.

In one embodiment, the first time window group only comprises one time window, and the first signal only comprises one sub-signal, where a part of the sub-signal located in the first time pool in the time window is transmitted.

In one embodiment, the first time window group comprises K1 time windows, K1 being a positive integer greater than 1; the first signal comprises K1 sub-signals, the K1 sub-signals being respectively transmitted in parts of the K1 time windows located in the first time pool.

In one embodiment, the second time window group only comprises one time window, and the second signal only comprises one sub-signal, where a part of the sub-signal located in the second time pool in the time window is transmitted.

In one embodiment, the second time window group comprises K2 time windows, K2 being a positive integer greater than 1; the second signal comprises K2 sub-signals, the K2 sub-signals being respectively transmitted in parts of the K2 time windows located in the second time pool.

In one embodiment, a first time sub-window is a part of a given time window located in a given time pool, and a first sub-signal is a sub-signal being transmitted in the first time sub-window among the K sub-signals; the first sub-signal is generated by a first coded bit block, the first coded bit block comprising more than one bit; the first coded bit block is an output by the first bit block through channel coding and rate matching; a number of multicarrier symbol(s) comprised in the first time sub-window is used to determine a number of bit(s) comprised in the first coded bit block; the given time window and the given time pool are respectively the first time window and the first time pool, or, the given time window and the given time pool are respectively the second time window and the second time pool.

In one subembodiment, the first sub-signal comprises an output by the first coded bit block through Modulation, Layer Mapping, Precoding, Mapping to Virtual Resource Blocks, and Mapping from Virtual to Physical Resource Blocks, and Multicarrier symbol Generation, as well as Modulation and Upconversion.

In one subembodiment, if the first time sub-window only comprises partial multicarrier symbols in the given time window, the number of bit(s) comprised in the first coded bit block is unrelated to the number of multicarrier symbol(s) comprised in the first time sub-window.

Embodiment 9

Embodiment 9 illustrates a schematic diagram of a first time pool, a second time pool and K time windows according to one embodiment of the present application; as shown in FIG. 9. In FIG. 9, indexes of the K time windows are #0, . . . and #(K−1), respectively.

In one embodiment, the first time window group only comprises one of the K time windows.

In one embodiment, the second time window group only comprises one of the K time windows.

In one embodiment, a sum of a number of time window(s) comprised in the first time window group and a number of time window(s) comprised in the second time window group is less than K.

Embodiment 10

Embodiment 10 illustrates a schematic diagram of a given time window and a given reference signal being associated according to one embodiment of the present application. as shown in FIG. 10. In Embodiment 10, the given time window is any time window among the K time windows, and the given reference signal is the first reference signal or the second reference signal; the K time windows are respectively reserved for the K sub-signals, the statement of a given time window and a given reference signal being associated meaning that: sub-signal(s) being transmitted in the given time window among the K sub-signals is(are) spatially linked with the given reference signal.

In one embodiment, the meaning of being spatially linked includes being Quasi-Co-Located (QCL).

In one embodiment, the meaning of being spatially linked includes being QCL with QCL-TypeA.

In one embodiment, the meaning of being spatially linked includes being QCL with QCL-TypeB.

In one embodiment, the meaning of being spatially linked includes being QCL with QCL-TypeC.

In one embodiment, the meaning of being spatially linked includes being QCL with QCL-TypeD.

In one embodiment, the meaning of being spatially linked includes: DMRS of sub-signal(s) being transmitted in the given time window among the K sub-signals is(are) QCL with the given reference signal.

In one embodiment, the meaning of being spatially linked includes: DMRS of sub-signal(s) being transmitted in the given time window among the K sub-signals is(are) QCL with the given reference signal, corresponding to QCL-TypeD.

In one embodiment, the meaning of being spatially linked includes: DMRS of sub-signal(s) being transmitted in the given time window among the K sub-signals is(are) QCL with the given reference signal, corresponding to QCL-TypeA.

In one embodiment, the meaning of being spatially linked includes: the given reference signal is used to determine large-scale properties of a channel that sub-signal(s) being transmitted in the given time window among the K sub-signals goes/go through.

In one embodiment, the meaning of being spatially linked includes: large-scale properties of a channel that sub-signal(s) being transmitted in the given time window among the K sub-signals goes/go through can be inferred from large-scale properties of a channel that the given reference signal goes/go through.

In one embodiment, the large-scale properties include one or more of a delay spread, a Doppler spread, a Doppler shift, an average delay or a Spatial Rx parameter.

In one embodiment, the meaning of being spatially linked includes: the given reference signal is used to determine a spatial domain filter of sub-signal(s) being transmitted in the given time window among the K sub-signals.

In one embodiment, the meaning of being spatially linked includes: the first node uses a same spatial domain filter to receive the given reference signal and transmit sub-signal(s) being transmitted in the given time window among the K sub-signals.

In one embodiment, the meaning of being spatially linked includes: the first node uses a same spatial domain filter to transmit the given reference signal and sub-signal(s) being transmitted in the given time window among the K sub-signals.

In one embodiment, the meaning of being spatially linked includes: precoding of the given reference signal is used to determine precoding of sub-signal(s) being transmitted in the given time window among the K sub-signals.

In one embodiment, the meaning of being spatially linked includes: sub-signal(s) being transmitted in the given time window among the K sub-signals and the given reference signal use the same precoding.

In one embodiment, the meaning of being spatially linked includes: a transmission antenna port of the given reference signal is used to determine a transmission antenna port of sub-signal(s) being transmitted in the given time window among the K sub-signals.

In one embodiment, the meaning of being spatially linked includes: sub-signal(s) being transmitted in the given time window among the K sub-signals and the given reference signal are transmitted by the same antenna port.

In one embodiment, any time window of the K time windows is only associated with one of the first reference signal or the second reference signal.

In one embodiment, the K time windows are sequentially indexed in an order of precedence in time domain.

In one embodiment, for any given time window among the K time windows, an index of the given time window in the K time windows is used to determine whether the given time window is associated with the first reference signal or the second reference signal, where the index of the given time window in the K time windows is a non-negative integer less than K.

In one embodiment, for a (x+1)-th time window among the K time windows, if x mod 2 is equal to 0, the (x+1)-th time window is associated with the first reference signal; if x mod 2 is equal to 1, the (x+1)-th time window is associated with the second reference signal; x is any non-negative integer less than K.

In one embodiment, for a (x+1)-th time window among the K time windows, if a first parameter mod 2 is equal to 0, the x-th time window is associated with the first reference signal; if the first parameter mod 2 is equal to 1, the x-th time window is associated with the second reference signal; the first parameter is equal to a second parameter being divided by 2 and rounded down to a nearest integer, the second parameter being equal to x mod 4; x is any non-negative integer less than K.

In one embodiment, time slices in the first time slice set are sequentially indexed in an order of precedence in time domain.

In one embodiment, for any given time window among the K time windows, the given time window belongs to a given time slice in the first time slice set; an index of the given time slice in the first time slice set is used to determine whether the given time window is associated with the first reference signal or the second reference signal, where the index of the given time slice in the first time slice set is a non-negative integer less than a number of time slices comprised in the first time slice set.

In one embodiment, for any given time window among the K time windows, the given time window belongs to a (y+1)-th time slice in the first time slice set; if y mod 2 is equal to 0, the given time window is associated with the first reference signal; if y mod 2 is equal to 1, the given time window is associated with the second reference signal; y is a non-negative integer less than a number of time slices comprised in the first time slice set.

In one embodiment, for any given time window among the K time windows, the given time window belongs to a (y+1)-th time slice in the first time slice set; if a first parameter mod 2 is equal to 0, the given time window is associated with the first reference signal; if the first parameter mod 2 is equal to 1, the given time window is associated with the second reference signal; the first parameter is equal to a second parameter being divided by 2 and rounded down to a nearest integer, the second parameter being equal to y mod 4; y is a non-negative integer less than a number of time slices comprised in the first time slice set.

Embodiment 11

Embodiment 11 illustrates a schematic diagram of how a first condition set relates to whether a first time pool comprises all multicarrier symbols in a first time window and whether a second time pool comprises all multicarrier symbols in a second time window according to one embodiment of the present application; as shown in FIG. 11. In Embodiment 11, if the first condition set is satisfied, the first time pool comprises all multicarrier symbols in the first time window, and the second time pool comprises all multicarrier symbols in the second time window.

In one embodiment, whether the first condition set is satisfied is used to determine whether the first time pool comprises all multicarrier symbols in the first time window and whether the second time pool comprises all multicarrier symbols in the second time window.

In one embodiment, the second time pool comprises all multicarrier symbols in the second time window.

In one embodiment, no matter whether the first condition set is satisfied, the second time pool constantly comprises all multicarrier symbols in the second time window.

In one embodiment, whether the second time pool comprises all multicarrier symbols in the second time window is unrelated to whether the first condition set is being satisfied.

In one embodiment, the first time pool comprises all multicarrier symbols in the first time window.

In one embodiment, no matter whether the first condition set is satisfied, the first time pool constantly comprises all multicarrier symbols in the first time window.

In one embodiment, whether the first time pool comprises all multicarrier symbols in the first time window is unrelated to whether the first condition set is being satisfied.

In one embodiment, if the first condition set is not satisfied, the first time pool does not comprise last P multicarrier symbol(s) in the first time window, P being a positive integer.

In one embodiment, if the first condition set is not satisfied, the second time pool does not comprise earliest P multicarrier symbol(s) in the second time window, P being a positive integer.

In one embodiment, if the first condition set is not satisfied, the first time pool does not comprise last P1 multicarrier symbol(s) in the first time window, and the second time pool does not comprise earliest P2 multicarrier symbol(s) in the second time window, where P1 and P2 are non-negative integers, respectively, a sum of P1 and P2 is equal to P, P being a positive integer.

In one embodiment, the first time window and the second time window are respectively reserved for a second sub-signal and a third sub-signal among the K sub-signals; whether there exists a sub-signal between the second sub-signal and the third sub-signal that carries a second-type bit block is used to determine a value of P1 and a value of P2; the second-type bit block carries Uplink Control Information (UCI).

In one subembodiment, if only the second sub-signal of the second sub-signal and the third sub-signal carries the second-type bit block, P1 is equal to 0, and P2 is equal to P.

In one subembodiment, if only the third sub-signal of the second sub-signal and the third sub-signal carries the second-type bit block, P1 is equal to P, and P2 is equal to 0.

Embodiment 12

Embodiment 12 illustrates a schematic diagram of a first condition set and S condition subset(s) according to one embodiment of the present application; as shown in FIG. 12. In Embodiment 12, if one of the S condition subset(s) is satisfied, the first condition set is satisfied; if each of the S condition subset(s) is not satisfied, the first condition set is not satisfied.

In one embodiment, S is equal to 1.

In one embodiment, S is greater than 1.

In one embodiment, the first condition set consists of the S condition subset(s).

In one embodiment, a fourth condition subset is one of the S condition subset(s), the fourth condition subset comprising that: the first node is not configured with a first higher-layer parameter.

Embodiment 13

Embodiment 13 illustrates a schematic diagram of S condition subset(s) and a first condition subset according to one embodiment of the present application; as shown in FIG. 13. In Embodiment 13, the S condition subset(s) includes (include) the first condition subset, the first condition subset comprising: the first time window and the second time window being separated by a time unit boundary.

In one embodiment, if the first condition subset is satisfied, the first condition set is satisfied.

In one embodiment, the statement of the first time window and the second time window being separated by a time unit boundary means that: there is a boundary of a time unit between the first time window and the second time window.

In one embodiment, the statement of the first time window and the second time window being separated by a time unit boundary means that: the first time window and the second time window respectively belong to two different time units.

In one embodiment, the time unit boundary refers to: a slot boundary.

In one embodiment, the time unit boundary refers to: a sub-slot boundary.

In one embodiment, the first condition subset comprises: the first time window and the second time window being separated by a time unit boundary, and at the time unit boundary separating the first time window and the second time window a transform from a first-type multicarrier symbol to a second-type multicarrier symbol occurs.

In one embodiment, the first condition subset comprises: the first time window and the second time window being separated by a time unit boundary, and at the time unit boundary separating the first time window and the second time window a transform from a first-type multicarrier symbol to a second-type multicarrier symbol occurs in a serving cell to which the first signal and the second signal belong.

In one embodiment, the first-type multicarrier symbol comprises a multicarrier symbol that can be used by the first node for transmitting a signal to a transmitter of the first signaling; the second-type multicarrier symbol comprises a multicarrier symbol that can be used by a transmitter of the first signaling for transmitting a signal to the first node.

In one embodiment, the first-type multicarrier symbol comprises a multicarrier symbol that can be used by a transmitter of the first signaling for transmitting a signal to the first node; the second-type multicarrier symbol comprises a multicarrier symbol that can be used by the first node for transmitting a signal to a transmitter of the first signaling.

In one embodiment, the first-type multicarrier symbol comprises an UpLink (UL) multicarrier symbol; the second-type multicarrier symbol comprises a DownLink (DL) multicarrier symbol.

In one embodiment, the first-type multicarrier symbol comprises a DL multicarrier symbol; the second-type multicarrier symbol comprises a UL multicarrier symbol.

Embodiment 14

Embodiment 14 illustrates a schematic diagram of S condition subset(s) and a second condition subset according to one embodiment of the present application; as shown in FIG. 14. In Embodiment 14, the S condition subset(s) includes(include) the second condition subset, the second condition subset comprising: the number of multicarrier symbol(s) existing between the first time window and the second time window is no smaller than the first value.

In one embodiment, if the second condition subset is satisfied, the first condition set is satisfied.

In one embodiment, the first value is configured by a higher layer parameter.

In one embodiment, the first value is configured by the first higher layer parameter.

In one embodiment, the first value is configured by a higher layer signaling.

In one embodiment, a higher layer signaling configuring the first value comprises information in all or partial fields in a RepetitionSchemeConfig IE.

In one embodiment, the first value is equal to 0.

In one embodiment, the first value is greater than 0.

In one embodiment, the first value is related to a subcarrier spacing corresponding to the first signal.

In one embodiment, when the first signal corresponds to a first subcarrier spacing, the first value is equal to a first integer; when the first signal corresponds to a second subcarrier spacing, the first value is equal to a second integer; the first subcarrier spacing is unequal to the second subcarrier spacing, and the first integer is unequal to the second integer.

In one subembodiment, the first subcarrier spacing is greater than the second subcarrier spacing, and the first integer is greater than the second integer.

In one embodiment, the first signal and the second signal correspond to a same subcarrier spacing.

In one embodiment, the K repetitions of the first bit block correspond to a same subcarrier spacing.

In one embodiment, any multicarrier symbol between the first time window and the second time window does not belong to the K time windows.

Embodiment 15

Embodiment 15 illustrates a schematic diagram of S condition subset(s) and a third condition subset according to one embodiment of the present application; as shown in FIG. 15. In Embodiment 15, the S condition subset(s) includes (include) the third condition subset, the third condition subset comprising: between the first time window and the second time window there exists one multicarrier symbol of which a type belongs to the first type set.

In one embodiment, if the third condition subset is satisfied, the first condition set is satisfied.

In one embodiment, a type of any multicarrier symbol existing between the first time window and the second time window is one of UL, DL, SL or Flexible.

In one embodiment, the first type set comprises a type of a multicarrier symbol that can be used by the first node for transmitting a signal to a transmitter of the first signaling.

In one embodiment, the first type set comprises a type of a multicarrier symbol that can be used by a transmitter of the first signaling for transmitting a signal to the first node.

In one embodiment, the first type set comprises DL.

In one embodiment, the first type set comprises Flexible.

In one embodiment, the first type set comprises UL.

In one embodiment, the first type set comprises DL and Flexible.

In one embodiment, the first type set only comprises DL.

Embodiment 16

Embodiment 16 illustrates a schematic diagram showing when a first condition set is not satisfied, a first time pool does not comprise last P1 multicarrier symbol(s) in a first time window and a second time pool does not comprise earliest P2 multicarrier symbol(s) in a second time window according to one embodiment of the present application; as shown in FIG. 16.

In one embodiment, at least one of a number of multicarrier symbols comprised in the first time window or a number of multicarrier symbols comprised in the second time window is used by the first node to determine a value of P1 and a value of P2.

In one embodiment, at least one of a number of multicarrier symbols comprised in the first time window or a number of multicarrier symbols comprised in the second time window is used by the second node to determine a value of P1 and a value of P2.

In one embodiment, P1 is equal to 0, and P2 is equal to P.

In one embodiment, P2 is equal to 0, and P1 is equal to P.

In one embodiment, P1 is greater than 0, and P2 is greater than 0.

In one embodiment, the first value is used to determine P.

In one embodiment, P is equal to the first value.

In one embodiment, P is less than the first value.

In one embodiment, P is equal to the first value being subtracted by a number of multicarrier symbol(s) existing between the first time window and the second time window.

In one embodiment, P is equal to the first value being subtracted by a number of multicarrier symbol(s) existing between the first time window and the second time window, and of which a type does not belong to the first type set.

In one embodiment, P is equal to the first value being subtracted by a number of multicarrier symbol(s) existing between the first time window and the second time window, and of which a type belongs to the first type set.

In one embodiment, if the number of multicarrier symbols comprised in the first time window is greater than or equal to P plus a third value, P2 is equal to 0, and P1 is equal to P, the third value being a non-negative integer.

In one embodiment, if the number of multicarrier symbols comprised in the second time window is greater than or equal to P plus a third value, P1 is equal to 0, and P2 is equal to P, the third value being a non-negative integer.

In one embodiment, the third value is equal to 0.

In one embodiment, the third value is equal to 1.

In one embodiment, the third value is equal to 2.

In one embodiment, the third value is fixed.

In one embodiment, the third value is configured by an RRC signaling.

In one embodiment, between the number of multicarrier symbols comprised in the first time window or the number of multicarrier symbols comprised in the second time window only the number of multicarrier symbols comprised in the first time window is used to determine a value of P1 and a value of P2.

In one embodiment, between the number of multicarrier symbols comprised in the first time window or the number of multicarrier symbols comprised in the second time window only the number of multicarrier symbols comprised in the second time window is used to determine a value of P1 and a value of P2.

In one embodiment, the number of multicarrier symbols comprised in the first time window and the number of multicarrier symbols comprised in the second time window are used together to determine a value of P1 and a value of P2.

In one embodiment, if the number of multicarrier symbols comprised in the first time window is less than P plus a third value, P1 is equal to the number of multicarrier symbols comprised in the first time window minus a second value, and P2 is equal to P minus P1.

In one embodiment, if the number of multicarrier symbols comprised in the second time window is less than P plus a third value, P2 is equal to the number of multicarrier symbols comprised in the second time window minus a second value, P1 is equal to P minus P2.

In one embodiment, the second value is a non-negative integer.

In one embodiment, the second value is equal to 0.

In one embodiment, the second value is greater than 0.

In one embodiment, the second value is equal to 1.

In one embodiment, the second value is greater than 1.

In one embodiment, the second value is configured by a higher layer signaling.

In one embodiment, the P1 and the P2 are respectively two non-negative integers satisfying that P1 plus P2 equals P and maximizing a smallest value between Q1 and Q2; Q1 is equal to the number of multicarrier symbols comprised in the first time window being subtracted by P1, and Q2 is equal to the number of multicarrier symbols comprised in the second time window being subtracted by P2.

Embodiment 17

Embodiment 17 illustrates a schematic diagram of whether a multicarrier symbol of which the type belongs to a first type set exists between a first time window and a second time window is used to determine a first value according to one embodiment of the present application; as shown in FIG. 17. In Embodiment 17, if there is one multicarrier symbol between the first time window and the second time window of which the type belongs to the first type set, the first value is equal to a third integer; if there isn't one multicarrier symbol between the first time window and the second time window of which the type belongs to the first type set, the first value is equal to a fourth integer; the third integer is unequal to the fourth integer; the third integer and the fourth integer are non-negative integers, respectively.

In one embodiment, whether there exists one multicarrier symbol between the first time window and the second time window of which a type belongs to the first type set is used by the first node to determine the first value.

In one embodiment, whether there exists one multicarrier symbol between the first time window and the second time window of which a type belongs to the first type set is used by the second node to determine the first value.

In one embodiment, the third integer is less than the fourth integer.

In one embodiment, the third integer is greater than the fourth integer.

In one embodiment, the third integer is equal to 0, while the fourth integer is greater than 0.

In one embodiment, the third integer is greater than 0, while the fourth integer is equal to 0.

In one embodiment, between the third integer and the fourth integer there exists one positive integer.

In one embodiment, the number of multicarrier symbol(s) existing between the first time pool and the second time pool is greater than the first value.

In one embodiment, the number of multicarrier symbol(s) existing between the first time pool and the second time pool is equal to the first value.

In one embodiment, the first value is used to determine the number of multicarrier symbol(s) in the first time window belonging to the first time pool.

In one embodiment, the first value is used to determine the number of multicarrier symbol(s) in the second time window belonging to the second time pool.

Embodiment 18

FIG. 18 illustrates a structure block diagram of a processing device used in a first node according to one embodiment of the present application; as shown in FIG. 18. In FIG. 18, a processing device 1800 in a first node comprises a first receiver 1801 and a first transmitter 1802.

In Embodiment 18, the first receiver 1801 receives a first signaling; the first transmitter 1802 transmits a first signal in a first time pool, and transmits a second signal in a second time pool.

In Embodiment 18, the first signaling is used to determine K time windows, K being a positive integer greater than 1; the first signal and the second signal both carry a first bit block; any one of the K time windows is associated with one of a first reference signal or a second reference signal, the first signaling being used to determine the first reference signal and the second reference signal; the first time pool comprises all or partial multicarrier symbols in one or multiple time windows being associated with the first reference signal among the K time windows, while the second time pool comprises all or partial multicarrier symbols in one or multiple time windows being associated with the second reference signal among the K time windows; a first time window and a second time window are respectively two time windows that are adjacent among the K time windows, the first time window and the second time window being respectively associated with the first reference signal and the second reference signal; the first time pool comprises all or partial multicarrier symbols in the first time window, while the second time pool comprises all or partial multicarrier symbols in the second time window; whether a first condition set is satisfied is used to determine at least one of:

> whether the first time pool comprises all multicarrier symbols in the first time window; or
> whether the second time pool comprises all multicarrier symbols in the second time window.

In one embodiment, the first condition set comprises S condition subset(s), S being a positive integer; when one of the S condition subset(s) is satisfied, the first condition set is satisfied; when each of the S condition subset(s) is not satisfied, the first condition set is not satisfied.

In one embodiment, a first condition subset is one of the S condition subset(s), the first condition subset comprising: the first time window and the second time window being separated by a time unit boundary.

In one embodiment, a second condition subset is one of the S condition subset(s), the second condition subset comprising: the number of multicarrier symbol(s) between the first time window and the second time window being no smaller than a first value, the first value being a non-negative integer.

In one embodiment, a third condition subset is one of the S condition subset(s), the third condition subset comprising: between the first time window and the second time window there exists one multicarrier symbol of which a type belongs to a first type set.

In one embodiment, when the first condition set is not satisfied, the first time pool does not comprise last P1 multicarrier symbol(s) in the first time window, and the second time pool does not comprise earliest P2 multicarrier symbol(s) in the second time window, where P1 and P2 are non-negative integers, respectively, a sum of P1 and P2 is equal to P, P being a positive integer; at least one of a number of multicarrier symbols comprised in the first time window or a number of multicarrier symbols comprised in the second time window is used to determine a value of P1 and a value of P2.

In one embodiment, whether there exists one multicarrier symbol between the first time window and the second time window of which a type belongs to a first type set is used to determine a first value, the first value being a non-negative integer; a number of multicarrier symbol(s) between the first time pool and the second time pool is no smaller than the first value.

In one embodiment, the first node is a UE.

In one embodiment, the first node is a relay node.

In one embodiment, the first receiver 1801 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1802 comprises at least one of the antenna 452, the transmitter 454, the transmitting processor 468, the multi-antenna transmitting processor 457, the controller/processor 459, the memory 460 or the data source 467 in Embodiment 4.

Embodiment 19

Embodiment 19 illustrates a structure block diagram of a processing device used in a second node according to one embodiment of the present application; as shown in FIG. 19. In FIG. 19, a processing device 1900 in a second node is comprised of a second transmitter 1901 and a second receiver 1902.

In Embodiment 19, the second transmitter 1901 transmits a first signaling; the second receiver 1902 receives a first signal in a first time pool, and receives a second signal in a second time pool.

In Embodiment 19, the first signaling is used to determine K time windows, K being a positive integer greater than 1; the first signal and the second signal both carry a first bit block; any one of the K time windows is associated with one of a first reference signal or a second reference signal, the first signaling being used to determine the first reference signal and the second reference signal; the first time pool comprises all or partial multicarrier symbols in one or multiple time windows being associated with the first reference signal among the K time windows, while the second time pool comprises all or partial multicarrier symbols in one or multiple time windows being associated with the second reference signal among the K time windows; a first time window and a second time window are respectively two time windows that are adjacent among the K time windows, the first time window and the second time window being respectively associated with the first reference signal and the second reference signal; the first time pool comprises all or partial multicarrier symbols in the first time window, while the second time pool comprises all or partial multicarrier symbols in the second time window; whether a first condition set is satisfied is used to determine at least one of:

> whether the first time pool comprises all multicarrier symbols in the first time window; or
> whether the second time pool comprises all multicarrier symbols in the second time window.

In one embodiment, the first condition set comprises S condition subset(s), S being a positive integer; when one of the S condition subset(s) is satisfied, the first condition set is satisfied; when each of the S condition subset(s) is not satisfied, the first condition set is not satisfied.

In one embodiment, a first condition subset is one of the S condition subset(s), the first condition subset comprising: the first time window and the second time window being separated by a time unit boundary.

In one embodiment, a second condition subset is one of the S condition subset(s), the second condition subset comprising: the number of multicarrier symbol(s) between the first time window and the second time window being no smaller than a first value, the first value being a non-negative integer.

In one embodiment, a third condition subset is one of the S condition subset(s), the third condition subset comprising: between the first time window and the second time window there exists one multicarrier symbol of which a type belongs to a first type set.

In one embodiment, when the first condition set is not satisfied, the first time pool does not comprise last P1 multicarrier symbol(s) in the first time window, and the second time pool does not comprise earliest P2 multicarrier symbol(s) in the second time window, where P1 and P2 are non-negative integers, respectively, a sum of P1 and P2 is equal to P, P being a positive integer; at least one of a number of multicarrier symbols comprised in the first time window or a number of multicarrier symbols comprised in the second time window is used to determine a value of P1 and a value of P2.

In one embodiment, whether there exists one multicarrier symbol between the first time window and the second time window of which a type belongs to a first type set is used to determine a first value, the first value being a non-negative integer; a number of multicarrier symbol(s) between the first time pool and the second time pool is no smaller than the first value.

In one embodiment, the second node is a base station.
In one embodiment, the second node is a UE.
In one embodiment, the second node is a relay node.
In one embodiment, the second transmitter 1901 comprises at least one of the antenna 420, the transmitter 418, the transmitting processor 416, the multi-antenna transmitting processor 471, the controller/processor 475 or the memory 476 in Embodiment 4.

In one embodiment, the second receiver 1902 comprises at least one of the antenna 420, the receiver 418, the receiving processor 470, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present application includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A user equipment (UE) for wireless communications, the UE comprising:
   a transceiver; and
   a processor, wherein the transceiver and the processor are configured to:
   receive a first signaling,
   determine, based on the first signaling, a first reference signal and a second reference signal,
   determine K time windows based on the first signaling, wherein K is a positive integer greater than 1,
   determine a first time pool comprising one or more multicarrier symbols in a first time window of the K time windows, and a second time pool comprising one or more multicarrier symbols in a second time window of the K time windows, wherein the first time window and the second time window are adjacent, and wherein the first time window and the second time window being are respectively associated with the first reference signal and the second reference signal,
   determine, based on whether a first condition set is satisfied, at least one of:
   whether the first time pool comprises all multicarrier symbols in the first time window, or whether the second time pool comprises all multicarrier symbols in the second time window, and transmit a first signal in the first time pool and a second signal in the second time pool, wherein the first signal and the second signal both carry a first bit block.

2. The UE according to claim 1, wherein the first condition set comprises S condition subsets, S being a positive integer, and wherein on a condition that one of the S condition subsets is satisfied, the first condition set is satisfied, and wherein on a condition that each of the S condition subsets is not satisfied, the first condition set is not satisfied.

3. The UE according to claim 2, wherein a first condition subset is one of the S condition subset, the first condition subset comprising: the first time window and the second time window being separated by a time unit boundary.

4. The UE according to claim 2, wherein a second condition subset is one of the S condition subsets, the second condition subset comprising: a number of multicarrier symbols between the first time window and the second time window being no smaller than a first value, the first value being a non-negative integer.

5. The UE according to claim 2, wherein a third condition subset is one of the S condition subsets, the third condition subset comprising: between the first time window and the second time window there exists one multicarrier symbol of which a type belongs to a first type set.

6. The UE according to claim 1, wherein on a condition that the first condition set is not satisfied, the first time pool does not comprise last P1 multicarrier symbols in the first time window, and the second time pool does not comprise earliest P2 multicarrier symbols in the second time window, wherein P1 and P2 are non-negative integers, respectively, a sum of P1 and P2 is equal to P, P being a positive integer, and wherein at least one of a number of multicarrier symbols comprised in the first time window or a number of multicarrier symbols comprised in the second time window is used to determine a value of P1 and a value of P2.

7. The UE according to claim 1, wherein whether there exists one multicarrier symbol between the first time window and the second time window of which a type belongs to a first type set is used to determine a first value, the first value being a non-negative integer, and wherein a number of multicarrier symbols between the first time pool and the second time pool is no smaller than the first value.

8. A base station for wireless communications, the base station comprising:

a transceiver; and a processor, wherein the transceiver and the processor are configured to:

transmit a first signaling, receive a first signal in a first time pool and receive a second signal in a second time pool, wherein the first signaling is used to determine K time windows, and wherein K is a positive integer greater than 1, and wherein the first signal and the second signal both carry a first bit block, and wherein the first signaling is used to determine a first reference signal and a second reference signal, and wherein the first time pool comprises one or more multicarrier symbols in a first time window of K time windows and the second time pool comprises one or more multicarrier symbols in a second time window of the K time windows, and wherein the first time window and the second time window are adjacent, the first time window and the second time window are respectively associated with the first reference signal and the second reference signal, and wherein whether a first condition set is satisfied is used to determine at least one of:

whether the first time pool comprises all multicarrier symbols in the first time window; or whether the second time pool comprises all multicarrier symbols in the second time window.

9. The base station according to claim 8, wherein the first condition set comprises S condition subset, S being a positive integer, and wherein on a condition that one of the S condition subsets is satisfied, the first condition set is satisfied; and wherein on a condition that each of the S condition subsets is not satisfied, the first condition set is not satisfied.

10. The base station according to claim 9, wherein a first condition subset is one of the S condition subsets, the first condition subset comprising: the first time window and the second time window being separated by a time unit boundary.

11. The base station according to claim 9, wherein a second condition subset is one of the S condition subsets, the second condition subset comprising: a number of multicarrier symbols between the first time window and the second time window being no smaller than a first value, the first value being a non-negative integer.

12. The base station according to claim 9, wherein a third condition subset is one of the S condition subsets, the third condition subset comprising: between the first time window and the second time window there exists one multicarrier symbol of which a type belongs to a first type set.

13. The base station according to claim 8, wherein on a condition that the first condition set is not satisfied, the first time pool does not comprise last P1 multicarrier symbols in the first time window, and the second time pool does not comprise earliest P2 multicarrier symbols in the second time window, where P1 and P2 are non-negative integers, respectively, a sum of P1 and P2 is equal to P, P being a positive integer, and wherein at least one of a number of multicarrier symbols comprised in the first time window or a number of multicarrier symbols comprised in the second time window is used to determine a value of P1 and a value of P2.

14. The base station according to claim 8, wherein whether there exists one multicarrier symbol between the first time window and the second time window of which a type belongs to a first type set is used to determine a first value, the first value being a non-negative integer; and wherein a number of multicarrier symbols between the first time pool and the second time pool is no smaller than the first value.

15. A method in a user equipment (UE) for wireless communications, comprising:

receiving a first signaling; and determining, based on the first signaling, a first reference signal and a second reference signal, determining K time windows based on the first signaling, wherein K is a positive integer greater than 1, determining a first time pool comprising one or more multicarrier symbols in a first time window of the K time windows, and a second time pool comprising one or more multicarrier symbols in a second time window of the K time windows, and wherein a first time window and a second time window are adjacent, and wherein the first time window and the second time window are respectively associated with the first reference signal and the second reference signal, and determine, based on whether a first condition set is satisfied, at least one of:

whether the first time pool comprises all multicarrier symbols in the first time window, or whether the second time pool comprises all multicarrier symbols in the second time window, and transmitting a first signal in the first time pool and a second signal in the second time pool, wherein the first signal and the second signal both carry a first bit block.

16. The method according to claim 15, wherein the first condition set comprises S condition subsets, S being a positive integer, and wherein on a condition that one of the S condition subsets is satisfied, the first condition set is satisfied, and wherein on condition that each of the S condition subsets is not satisfied, the first condition set is not satisfied.

17. The method according to claim 16, wherein a first condition subset is one of the S condition subsets, the first condition subset comprising: the first time window and the second time window being separated by a time unit boundary.

18. The method according to claim 16, wherein a second condition subset is one of the S condition subsets, the second condition subset comprising: a number of multicarrier symbols between the first time window and the second time window being no smaller than a first value, the first value being a non-negative integer.

19. The method according to claim 16, wherein a third condition subset is one of the S condition subsets, the third condition subset comprising: between the first time window and the second time window there exists one multicarrier symbol of which a type belongs to a first type set.

20. The method according to claim 15, wherein on a condition that the first condition set is not satisfied, the first time pool does not comprise last P1 multicarrier symbols in the first time window, and the second time pool does not comprise earliest P2 multicarrier symbols in the second time window, where P1 and P2 are non-negative integers, respectively, a sum of P1 and P2 is equal to P, P being a positive integer, and wherein at least one of a number of multicarrier symbols comprised in the first time window or a number of multicarrier symbols comprised in the second time window is used to determine a value of P1 and a value of P2, or, whether there exists one multicarrier symbol between the first time window and the second time window of which a type belongs to a first type set is used to determine a first value, the first value being a non-negative integer; and wherein a number of multicarrier symbols between the first time pool and the second time pool is no smaller than the first value.

* * * * *